(12) United States Patent
Leonard

(10) Patent No.: US 11,554,723 B1
(45) Date of Patent: Jan. 17, 2023

(54) VEHICLE-MOUNTED HOIST SYSTEMS AND METHODS

(71) Applicant: Ralph L. Leonard, North Charleston, SC (US)

(72) Inventor: Ralph L. Leonard, North Charleston, SC (US)

( * ) Notice: Subject to any disclaimer, the term of this patent is extended or adjusted under 35 U.S.C. 154(b) by 0 days.

(21) Appl. No.: 17/711,108

(22) Filed: Apr. 1, 2022

(51) Int. Cl.
    *B60R 9/042*     (2006.01)

(52) U.S. Cl.
    CPC ................................. *B60R 9/042* (2013.01)

(58) Field of Classification Search
    CPC .................................. B60R 9/04; B60R 9/042
    See application file for complete search history.

(56) References Cited

U.S. PATENT DOCUMENTS

| | | | |
|---|---|---|---|
| 2,967,635 A | 1/1961 | Barnett | |
| 3,139,203 A | 6/1964 | Borger | |
| 3,215,294 A | 11/1965 | Salamin | |
| 3,596,788 A * | 8/1971 | Willie | E04H 15/06 414/718 |
| 3,608,759 A | 9/1971 | Arvada et al. | |
| 3,720,334 A * | 3/1973 | Permut | B60R 9/042 414/607 |
| 3,836,024 A | 9/1974 | Mantino | |
| 3,927,779 A | 12/1975 | Johnson | |
| 3,952,893 A | 4/1976 | Kolesar | |
| 4,134,509 A | 1/1979 | Clement | |
| 4,139,110 A | 2/1979 | Roberts | |
| 4,272,218 A | 1/1981 | Carter | |
| 4,659,276 A | 4/1987 | Billett | |
| 4,700,851 A | 10/1987 | Reeve et al. | |
| 4,948,024 A * | 8/1990 | Warner | B60R 9/042 224/310 |
| 4,953,757 A * | 9/1990 | Stevens | B60R 9/042 224/310 |
| 5,346,355 A * | 9/1994 | Riemer | B60R 9/042 224/310 |
| 5,360,151 A | 11/1994 | Fine | |

(Continued)

OTHER PUBLICATIONS

Amendment dated Aug. 24, 2022, for U.S. Appl. No. 17/711,103.

(Continued)

*Primary Examiner* — Saul Rodriguez
*Assistant Examiner* — Ashley K Romano
(74) *Attorney, Agent, or Firm* — Nelson Mullins Riley & Scarborough LLP

(57) ABSTRACT

Lift assemblies and methods of operating same. A method includes providing a lift assembly including a first support member and a boom pivotably coupled with a second support member. The lift assembly also includes a bearing disposed between the first and second support members. The bearing includes an inner ring and an outer ring and a gear is engaged with one of the inner ring and the outer ring. A lift line is coupled with the boom. The method also includes attaching the first support member to the vehicle, pivoting the boom relative to the second support member about a first axis, and rotating the second support member relative to the first support member about a second axis perpendicular to the first axis. Further, the method includes attaching a load to the lift line and operating the lift assembly to move the load onto a roof of the vehicle.

20 Claims, 25 Drawing Sheets

(56) References Cited

U.S. PATENT DOCUMENTS

| | | | |
|---|---|---|---|
| 5,423,650 A * | 6/1995 | Zerbst | B60R 9/042 |
| | | | 224/310 |
| 5,460,472 A | 10/1995 | Bamber | |
| 5,505,579 A * | 4/1996 | Ray | B60P 3/1025 |
| | | | 224/310 |
| 5,709,521 A | 1/1998 | Glass | |
| 5,827,036 A | 10/1998 | Steffes et al. | |
| 5,853,282 A | 12/1998 | Bechler et al. | |
| 5,904,463 A | 5/1999 | Christensen | |
| 5,975,832 A | 11/1999 | Winkler | |
| 6,547,507 B1 | 4/2003 | Gest et al. | |
| 6,634,529 B2 | 10/2003 | Choiniere et al. | |
| 6,688,836 B2 | 2/2004 | Gourand | |
| 7,377,740 B2 | 5/2008 | Panzarella et al. | |
| 9,290,130 B2 | 3/2016 | Buller | |
| 9,346,409 B2 | 5/2016 | Pfaeffli | |
| 9,630,816 B1 | 4/2017 | Napieralski et al. | |
| 9,758,106 B2 | 9/2017 | Zimmer | |
| 9,937,088 B2 | 4/2018 | Guertler et al. | |
| 9,975,740 B2 | 5/2018 | McVaugh | |
| 10,040,402 B1 | 8/2018 | Brusselback | |
| 10,046,711 B2 | 8/2018 | Zimmer | |
| 10,246,025 B1 | 4/2019 | Knigge | |
| 10,343,581 B1 | 7/2019 | Leonard | |
| 10,773,630 B1 * | 9/2020 | Thompson | B60R 9/042 |
| 11,130,435 B2 | 9/2021 | Leonard | |
| 2003/0039535 A1 | 2/2003 | Gourand | |
| 2007/0007316 A1 | 1/2007 | Witczak | |
| 2008/0035688 A1 | 2/2008 | Malone | |
| 2010/0111661 A1 | 5/2010 | Svanda | |
| 2011/0024472 A1 | 2/2011 | Thompson et al. | |
| 2013/0315693 A1 * | 11/2013 | Diverdi | B60P 3/40 |
| | | | 414/800 |
| 2016/0001832 A1 | 1/2016 | Beiler | |
| 2016/0023586 A1 | 1/2016 | Potticary et al. | |
| 2016/0280114 A1 * | 9/2016 | Baxter, Jr. | B60R 9/08 |
| 2016/0362281 A1 | 12/2016 | McVaugh | |
| 2017/0120833 A1 * | 5/2017 | Rudnicki | B60R 9/042 |
| 2018/0050622 A1 | 2/2018 | Roberts et al. | |
| 2018/0162288 A1 | 6/2018 | Sautter et al. | |
| 2018/0264983 A1 | 9/2018 | Lin et al. | |
| 2018/0281692 A1 | 10/2018 | Fitfield | |
| 2019/0241127 A1 * | 8/2019 | Schweitzer | B60R 9/045 |
| 2020/0180515 A1 * | 6/2020 | Dimmen | B60R 9/042 |
| 2020/0406830 A1 * | 12/2020 | Owen | B62H 3/12 |
| 2021/0206323 A1 * | 7/2021 | Carbone | B60R 9/055 |
| 2021/0276493 A1 * | 9/2021 | Neill | B60R 9/08 |
| 2021/0339670 A1 | 11/2021 | Leonard | |
| 2022/0176883 A1 * | 6/2022 | Pilkington | B60R 9/042 |

OTHER PUBLICATIONS

Notice of Allowance dated Sep. 12, 2022, for U.S. Appl. No. 17/711,103.

Comment on Reasons for Allowance filed Sep. 20, 2022, for U.S. Appl. No. 17/711,103.

Non-Final Office Action dated May 25, 2022, for U.S. Appl. No. 17/711,103.

* cited by examiner

VEHICLE-MOUNTED HOIST SYSTEMS AND METHODS

TECHNICAL FIELD

Embodiments of the present invention generally relate to systems, assemblies, and associated methods for lifting and lowering objects to be secured, stored, and/or transported the exterior of a vehicle.

BACKGROUND

It is often necessary or desirable to secure and transport various objects on a roof of a vehicle. Such objects can include, among others, luggage, recreational equipment, furniture, and other items that may not fit in the vehicle's interior. Various systems are known for securing and transporting such objects. For example, the object(s), or a container in which the object(s) will be stored, can be attached to a roof rack that is mounted to the roof of the vehicle.

The foregoing discussion is intended only to illustrate various aspects of the related art in the field of the invention at the time, and should not be taken as a disavowal of claim scope.

SUMMARY

Although various systems are known for securing and transporting objects on the roof of a vehicle, it is often difficult to lift such objects onto and/or off of the vehicle roof in the first place. For instance, objects to be transported can be large, heavy, and otherwise unwieldy, such that a single or multiple individuals cannot easily lift the objects onto the vehicle's roof. Further, the roofs of many modern vehicles (especially, for example, passenger vans) are well above the height of an average adult human, making lifting more challenging. These challenges are only exacerbated for individuals with disabilities, such as those who need the assistance of a wheelchair or who may lack upper body strength or mobility.

It is known to mount a hoist device on the roof of a vehicle for lifting and lowering objects onto the vehicle. However, known hoist devices suffer from a number of drawbacks. For example, where a vehicle is on a non-level surface, or when the hoist device is mounted to the vehicle's roof or roof rack in a non-level manner, a lifting boom may swing unpredictably and in the downward-facing direction under the force of gravity. Moving the hoist device (or a load attached thereto) under these conditions can require considerable torque and can be very difficult or impossible to do manually. This may be dangerous to users and impractical. Known devices do not permit safe operation of a lift assembly that is coupled with a vehicle that is disposed on a non-level surface. Moreover, known devices are not constructed in a robust enough manner to reduce the risk of material and structural fatigue. In contrast, embodiments of the present invention provide lift assemblies that can be attached to a vehicle (e.g., to a vehicle's roof or roof rack) and methods for operating such lift assemblies that overcome these and other problems with known devices.

According to one embodiment, the present invention comprises a lift assembly for a vehicle. The lift assembly comprises a base configured to be attached to a roof of the vehicle and a first support member coupled with the base. The lift assembly also comprises a boom having a proximal end and a distal end, the boom proximal end coupled with a second support member and pivotable with respect thereto about a first axis. The second support member is coupled with the first support member and rotatable with respect thereto about a second axis perpendicular to the first axis. The lift assembly also comprises a gear coupled with one of the first support member and the second support member, and the gear is in engagement with gear teeth on the other of the first support member and the second support member. Further, the lift assembly comprises a first lift line coupled with the boom distal end.

According to yet another embodiment, the present invention comprises a lift assembly for a vehicle. The lift assembly comprises a base configured to be attached to a roof of the vehicle and a first support member movably coupled with the base. Also, the lift assembly comprises a boom having a proximal end and a distal end, the boom proximal end coupled with a second support member and pivotable with respect thereto about a first axis. The second support member is coupled with the first support member via a bearing, the bearing comprising gear teeth, and the second support member is rotatable with respect to the first support member about a second axis perpendicular to the first axis. Further, the lift assembly comprises a lift line coupled with the boom distal end.

According to a further embodiment, the present invention comprises a lift assembly for a vehicle. The lift assembly comprises a base configured to be attached to a roof of the vehicle and a first support member coupled with the base. Also, the lift assembly comprises a boom coupled with a second support member, and the boom is pivotable with respect to the second support member about a first axis. Further, the lift assembly comprises a bearing disposed between the first and second support members. The bearing comprises an inner ring and an outer ring. The second support member is rotatable relative to the first support member about a second axis perpendicular to the first axis. A gear is engaged with one of the inner ring and the outer ring, and a lift line is coupled with the boom.

In another embodiment, the present invention comprises a method of operating a lift assembly for a vehicle. The method comprises providing a lift assembly comprising a first support member and a boom having a proximal end and a distal end. The boom proximal end is pivotably coupled with a second support member, and the boom distal end is pivotable relative to the second support member. The lift assembly also comprises a bearing coupled between the first and second support members and a gear coupled with one of the first support member and the second support member. The gear is in engagement with gear teeth on the other of the first support member and the second support member. Also, the lift assembly comprises a first lift line coupled with the boom distal end. The method additionally comprises coupling the first support member with a roof of the vehicle and pivoting the boom distal end relative to the second support member about a first axis. Further, the method comprises rotating the second support member relative to the first support member about a second axis perpendicular to the first axis by driving the gear.

According to a further embodiment, the present invention comprises a method of operating a lift assembly for a vehicle. The method comprises providing a lift assembly comprising a first support member and a second support member rotatably coupled with the first support member via a bearing, the bearing comprising gear teeth. The lift assembly also comprises a boom having a proximal end and a distal end. The boom proximal end is coupled with the second support member and pivotable relative to the second support member about a first axis. The second support member is rotatable relative to the first support member about a second axis, the second axis perpendicular to the first axis. Additionally, the lift assembly comprises a lift line coupled with the boom distal end. The method further comprises coupling the first support member of the lift assembly with a roof of the vehicle and rotating the second support member about the second axis. The method also comprises pivoting the boom distal end about the first axis through an angular displacement.

In yet another embodiment, the present invention comprises a method of operating a lift assembly for a vehicle. The method comprises providing a lift assembly comprising a first support member and a boom pivotably coupled with a second support member. The lift assembly also comprises a bearing disposed between the first and second support members. The bearing comprises an inner ring and an outer ring and a gear is engaged with one of the inner ring and the outer ring. A lift line is coupled with the boom. The method also comprises attaching the first support member to the vehicle, pivoting the boom relative to the second support member about a first axis, and rotating the second support member relative to the first support member about a second axis perpendicular to the first axis. Further, the method comprises attaching a load to the lift line and operating the lift assembly to move the load onto a roof of the vehicle.

BRIEF DESCRIPTION OF THE DRAWINGS

Figure 1:
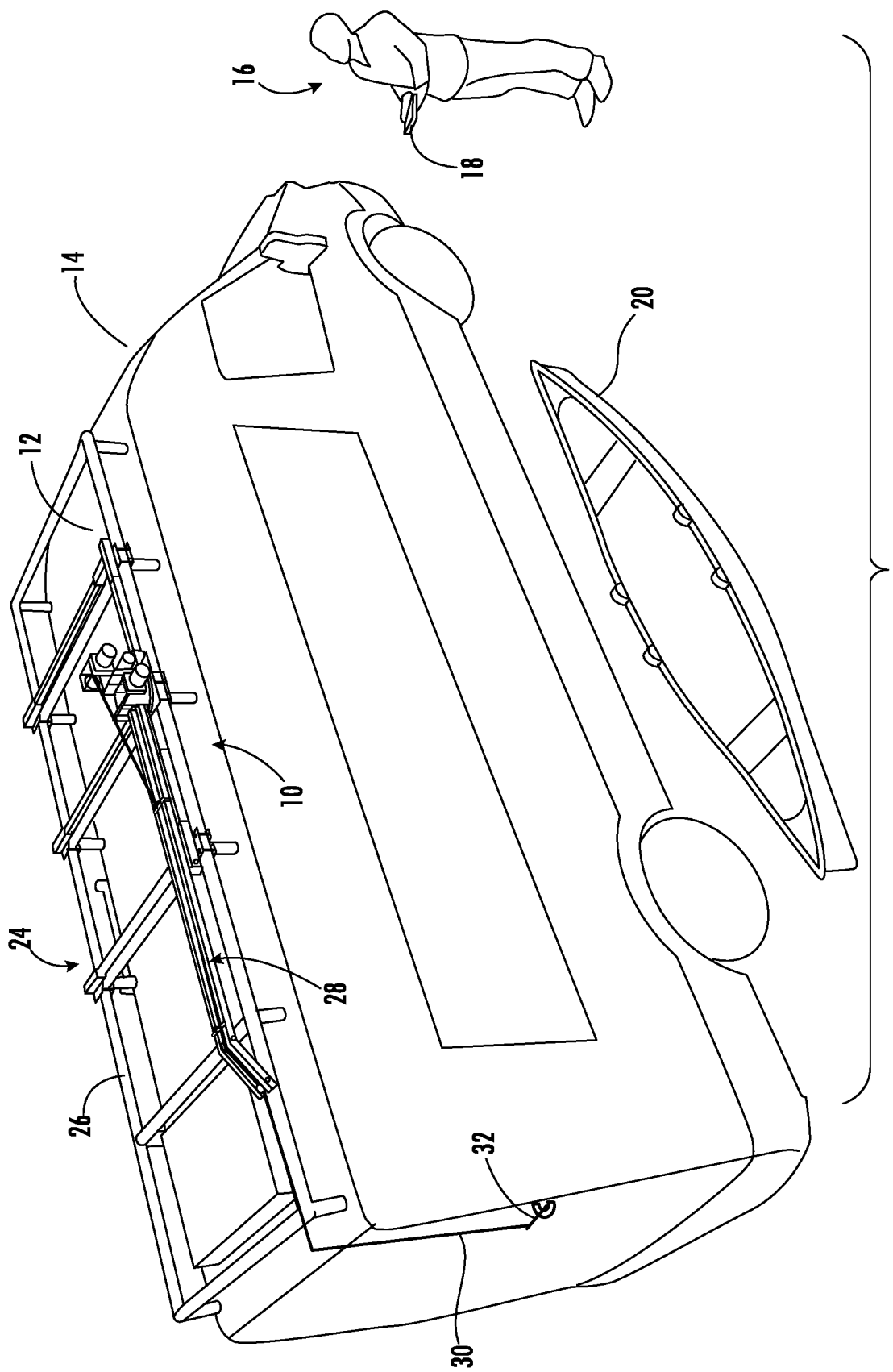
Figure 2:
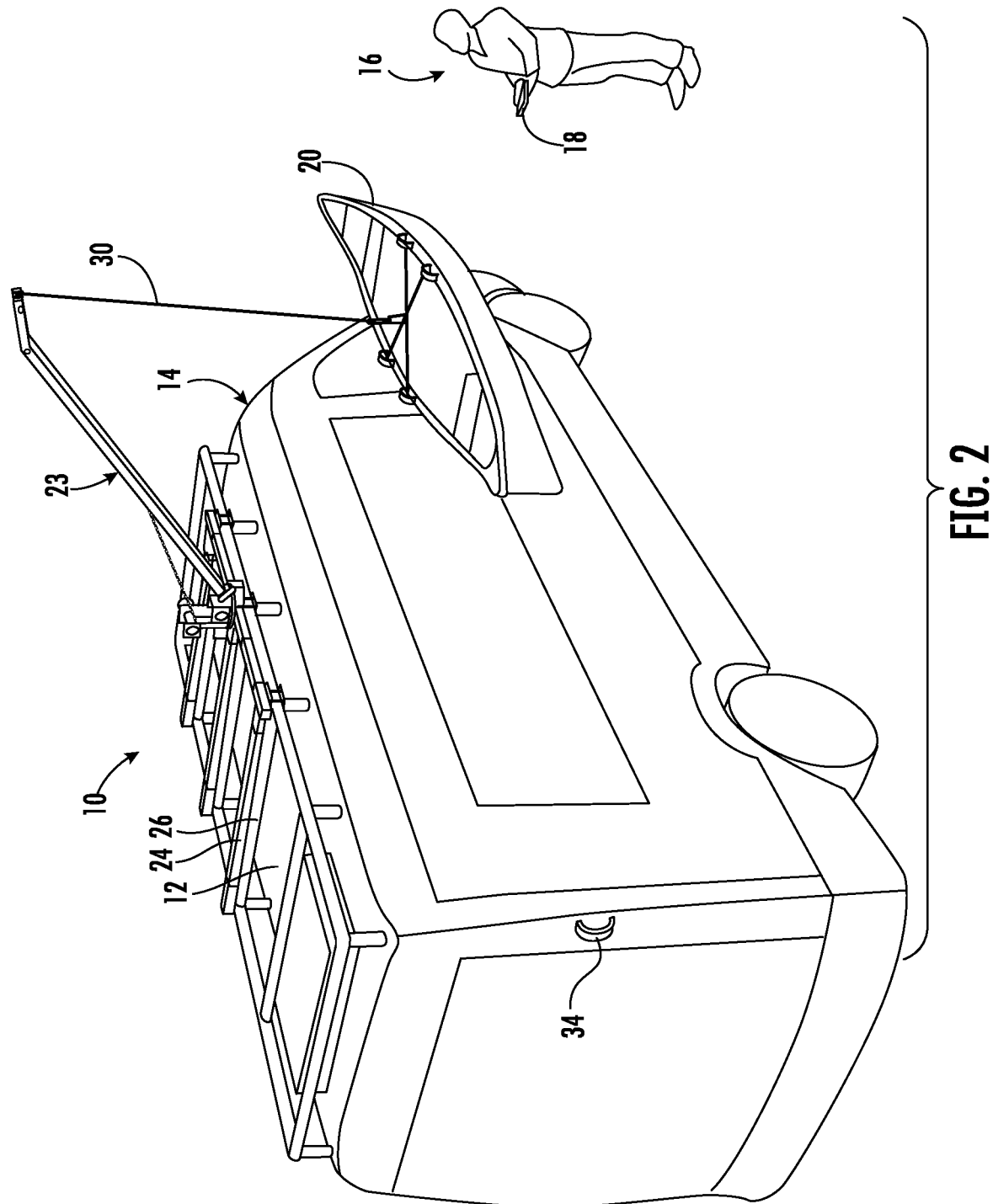
Figure 3:
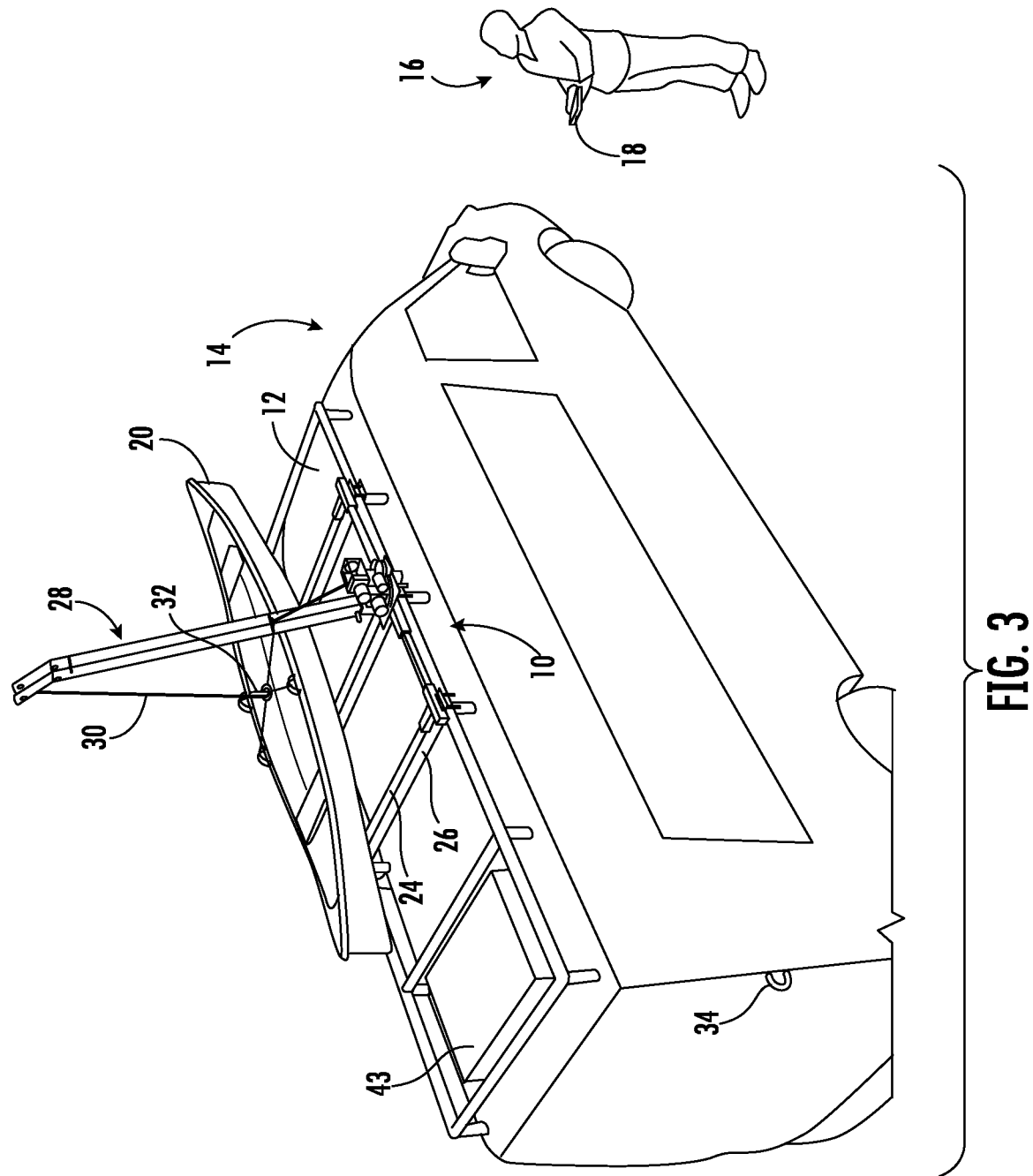
Figure 4:
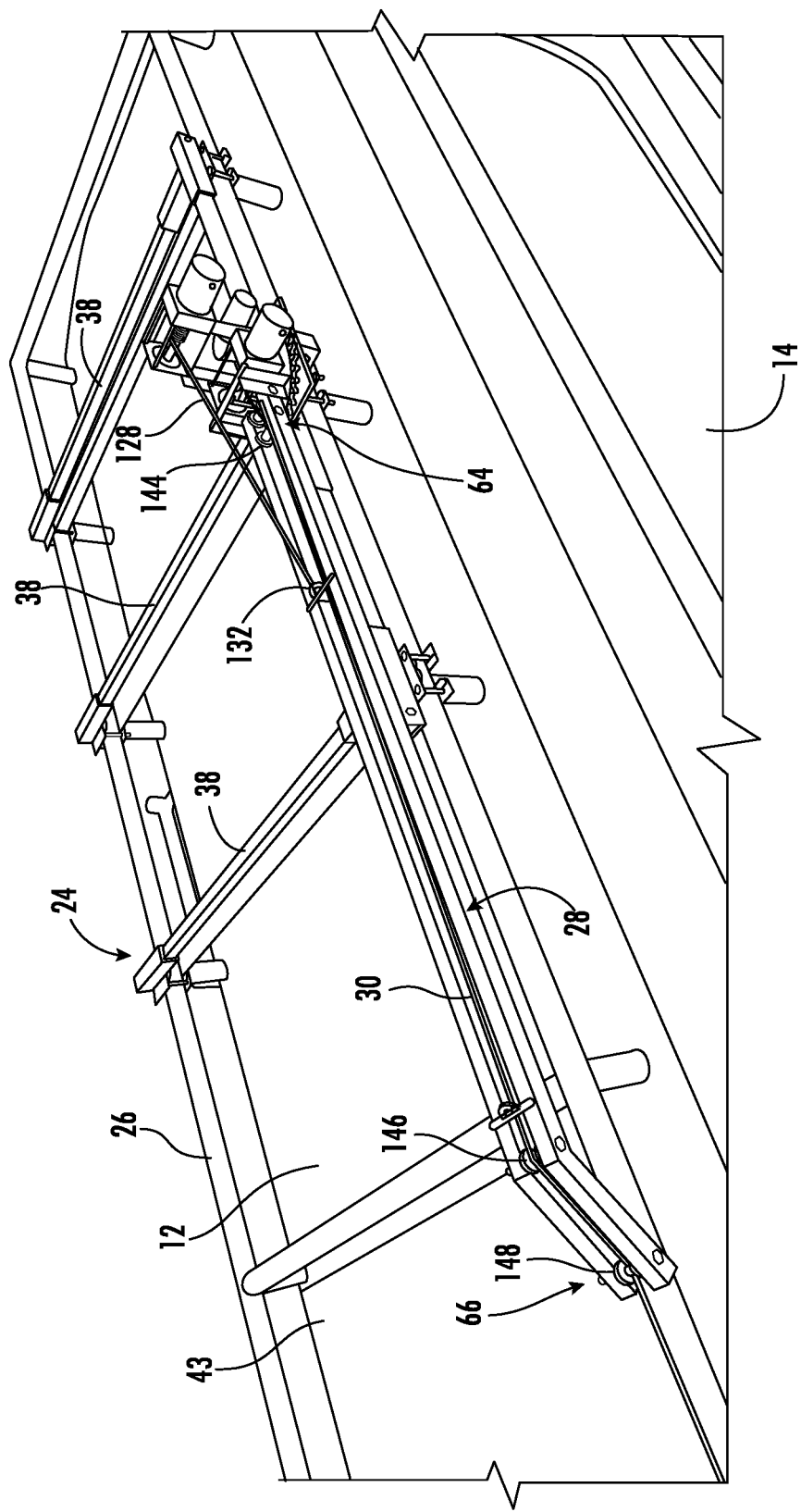
Figure 5:
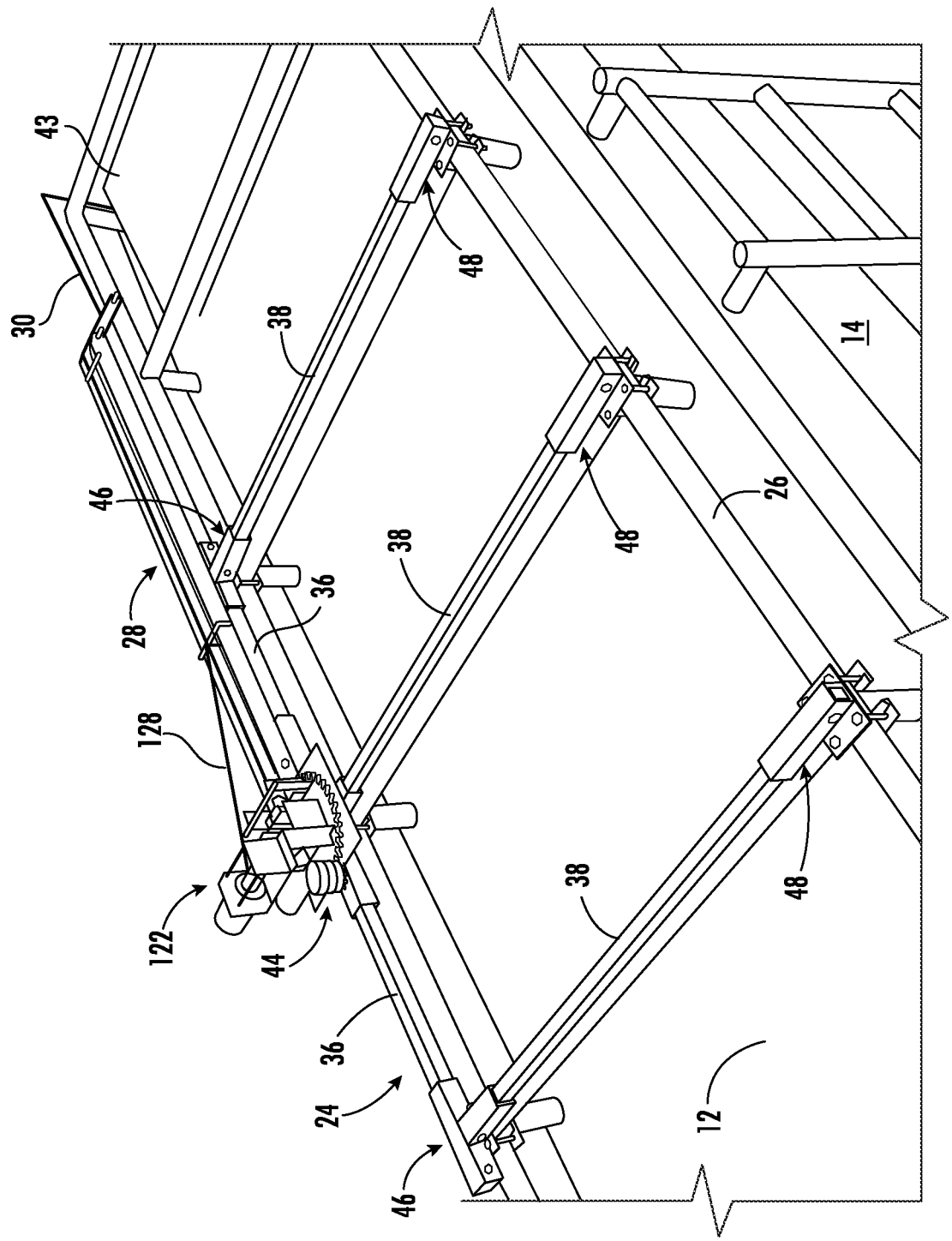
Figure 6:
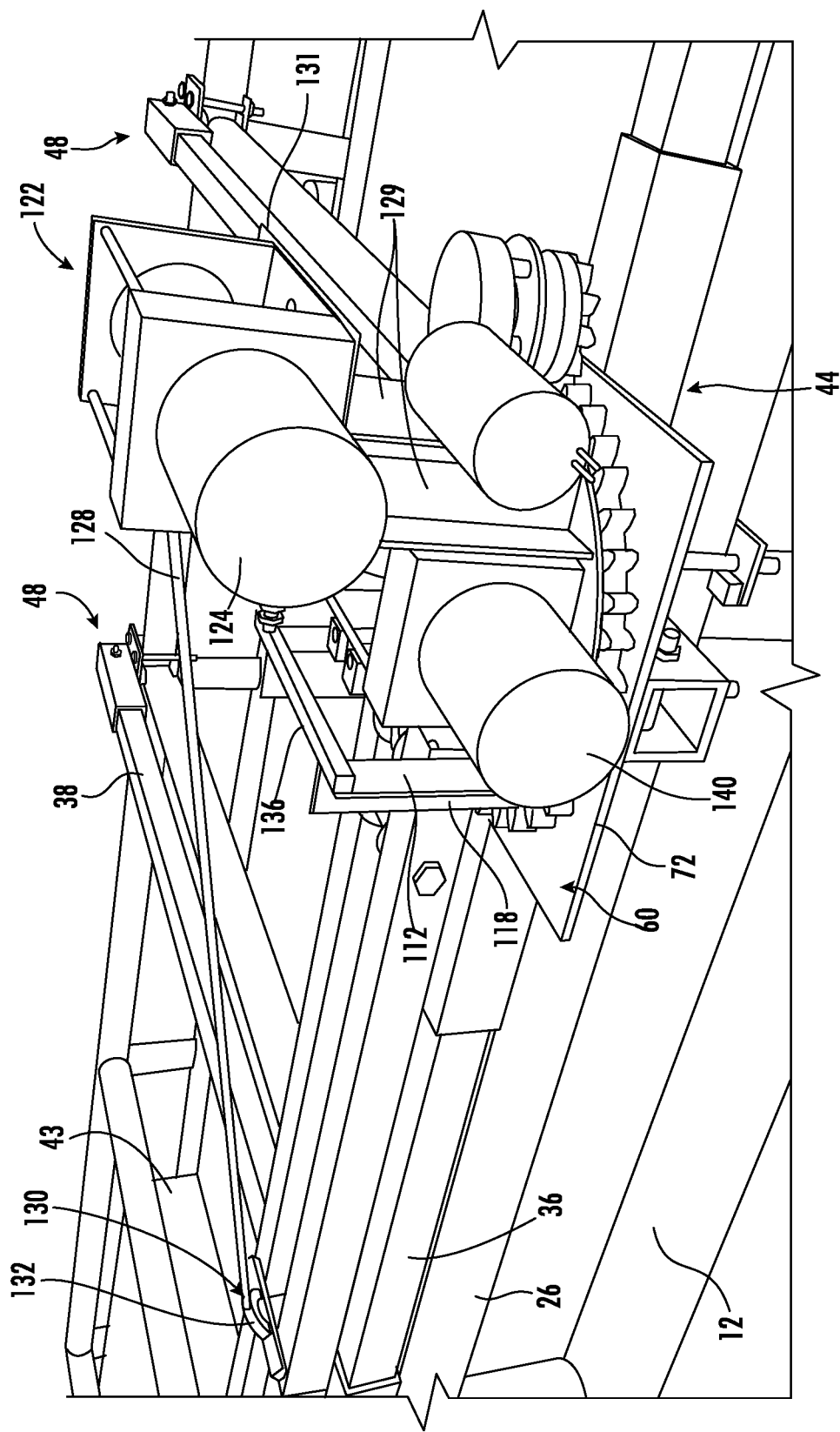
Figure 7:
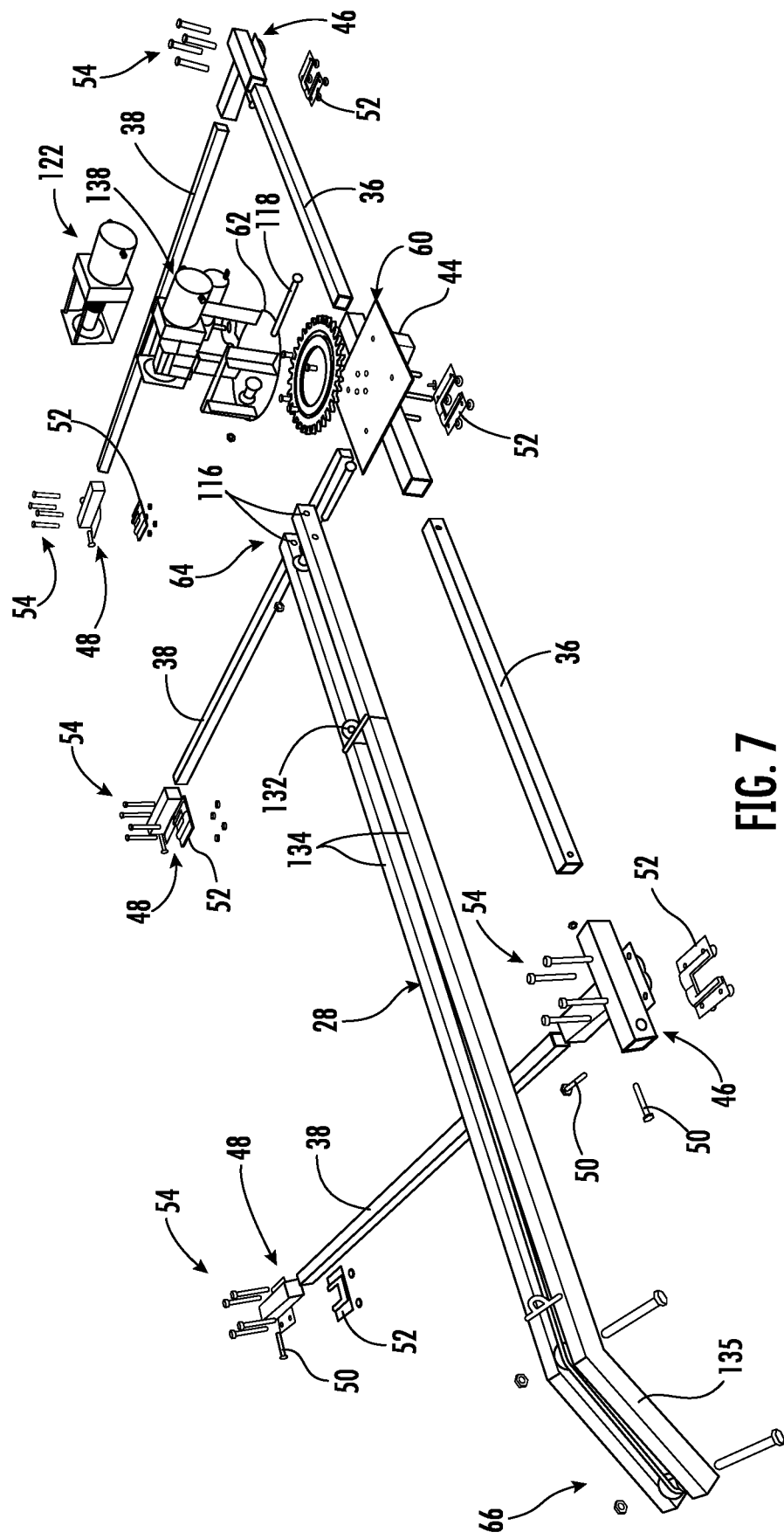
Figure 8:
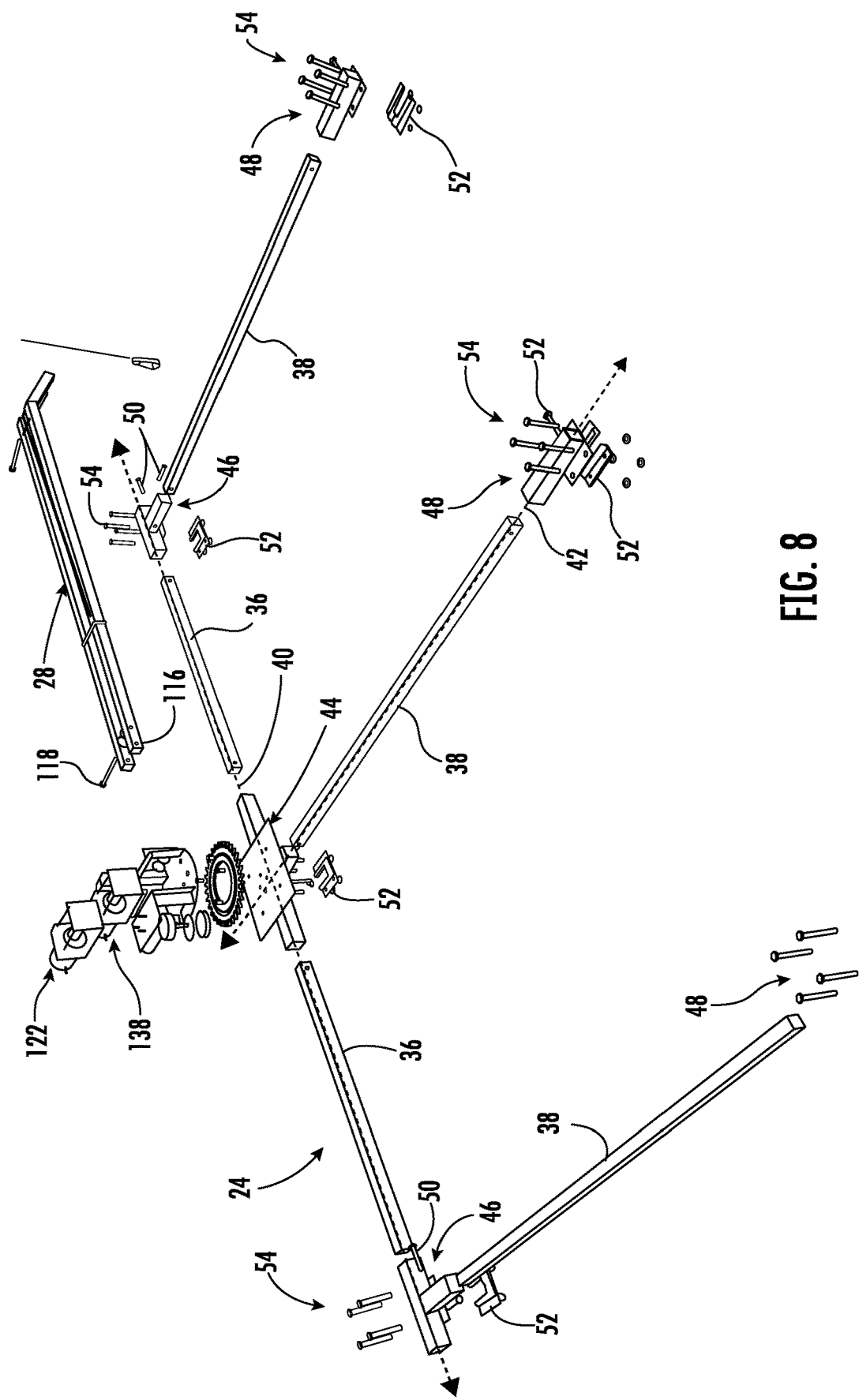
Figure 9:
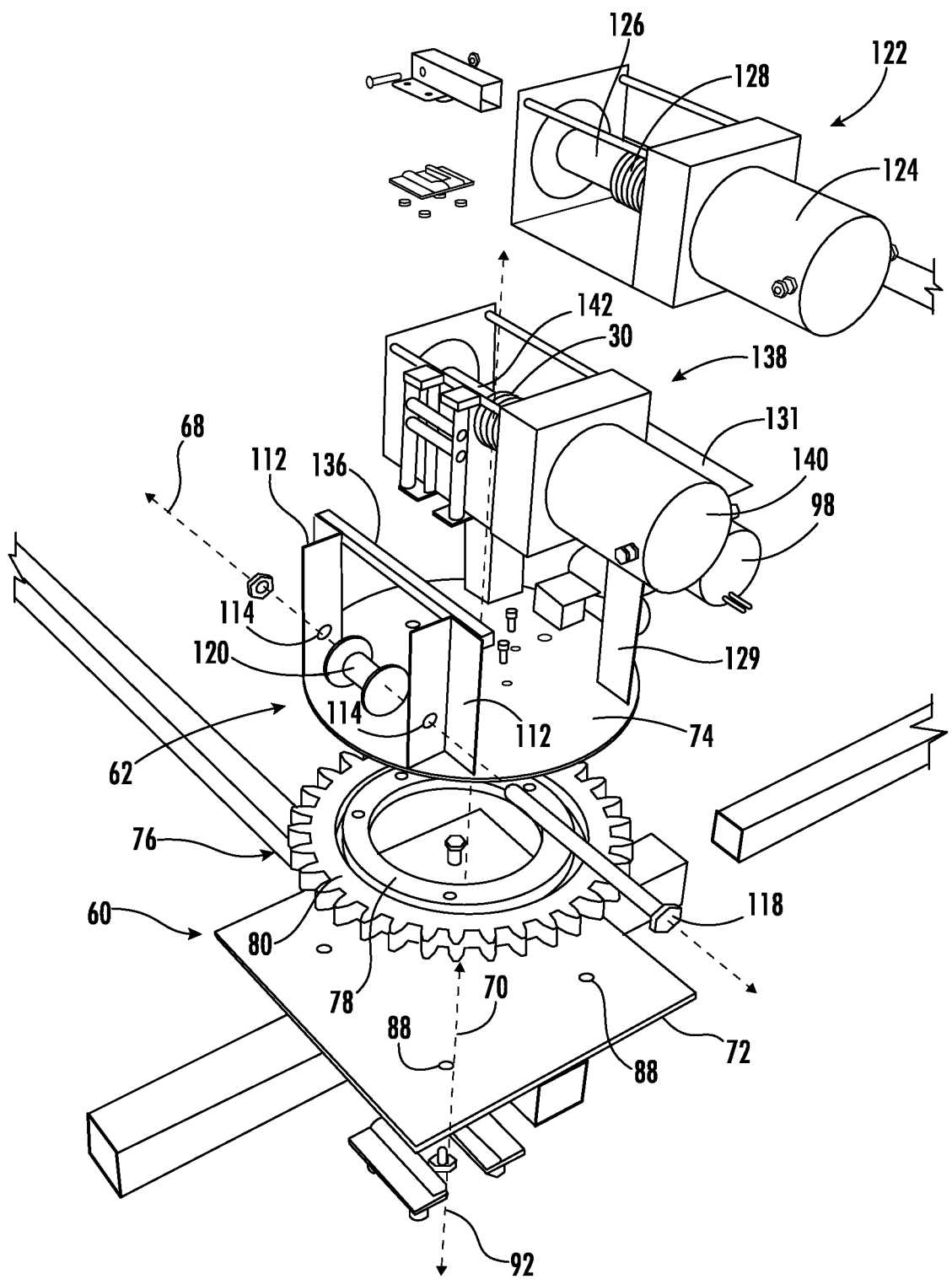
Figure 10:
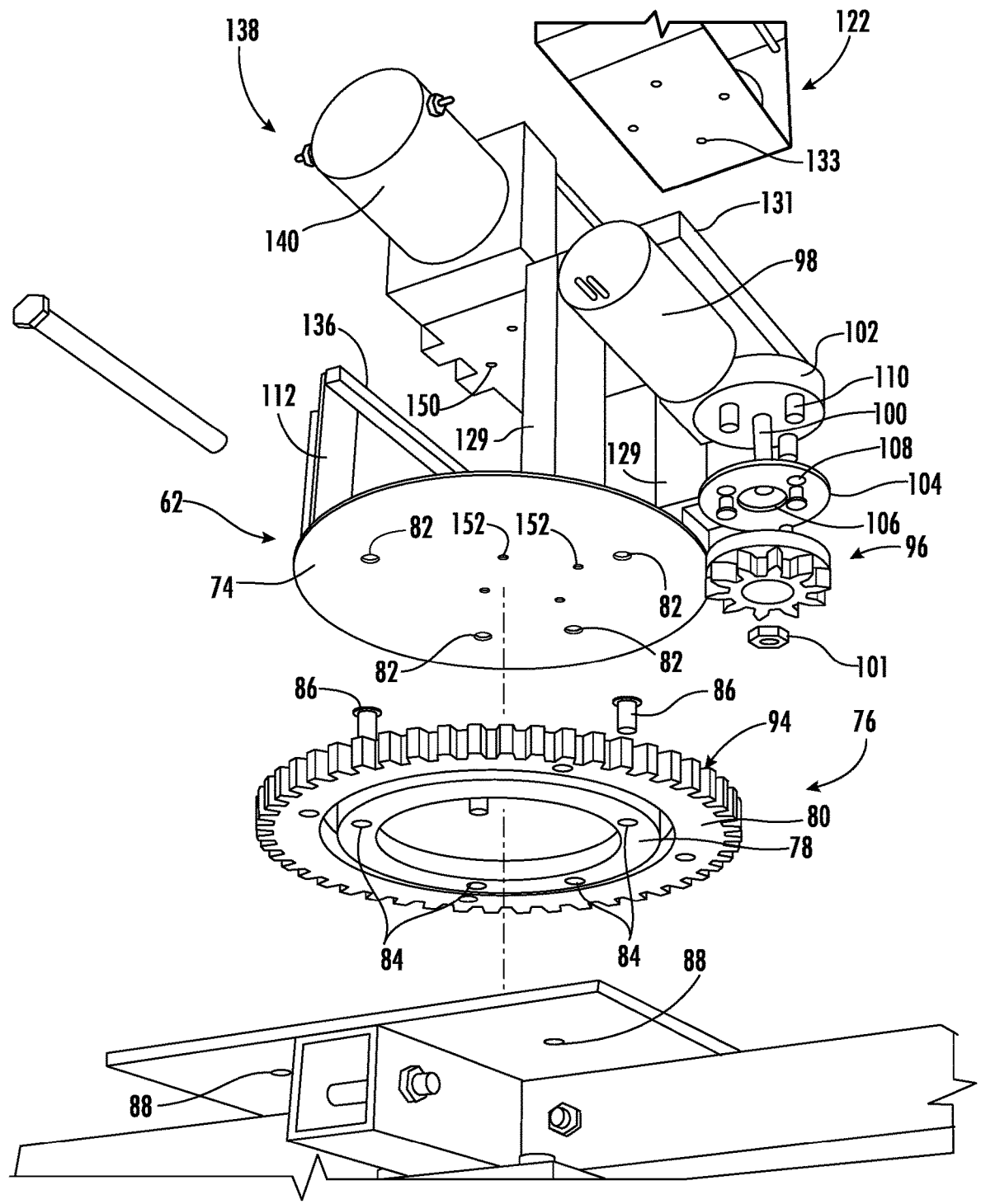
Figure 11:
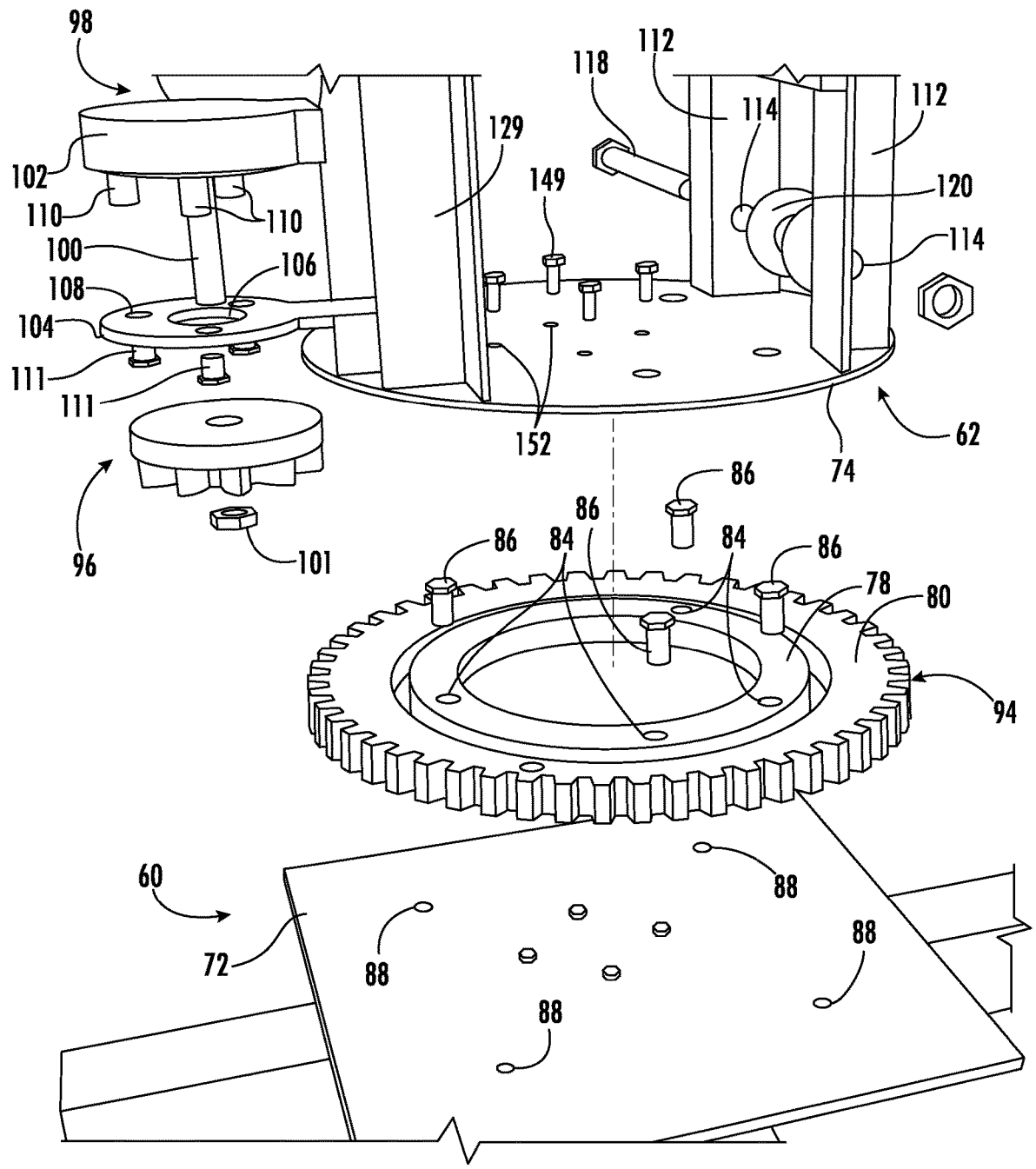
Figure 12:
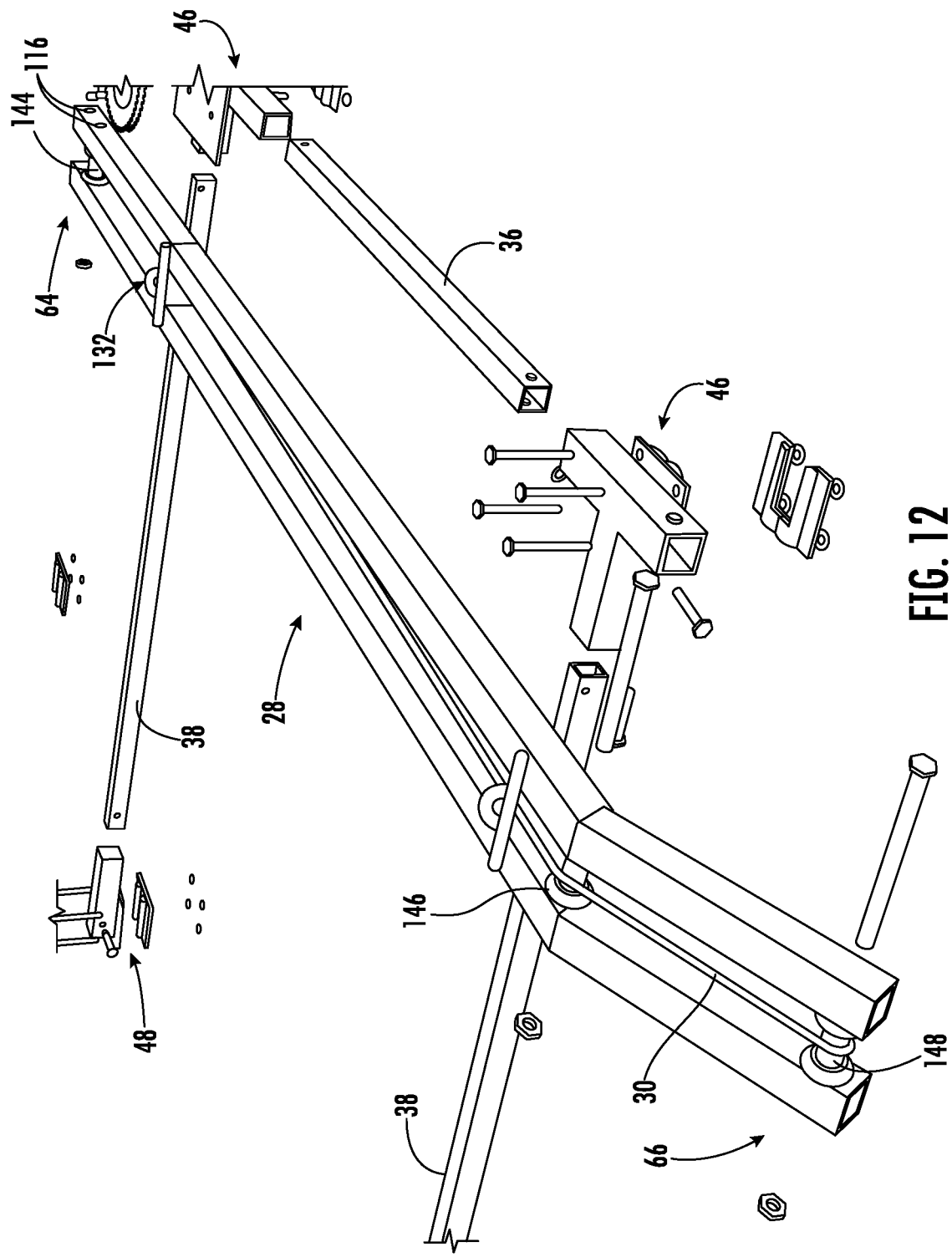
Figure 13:
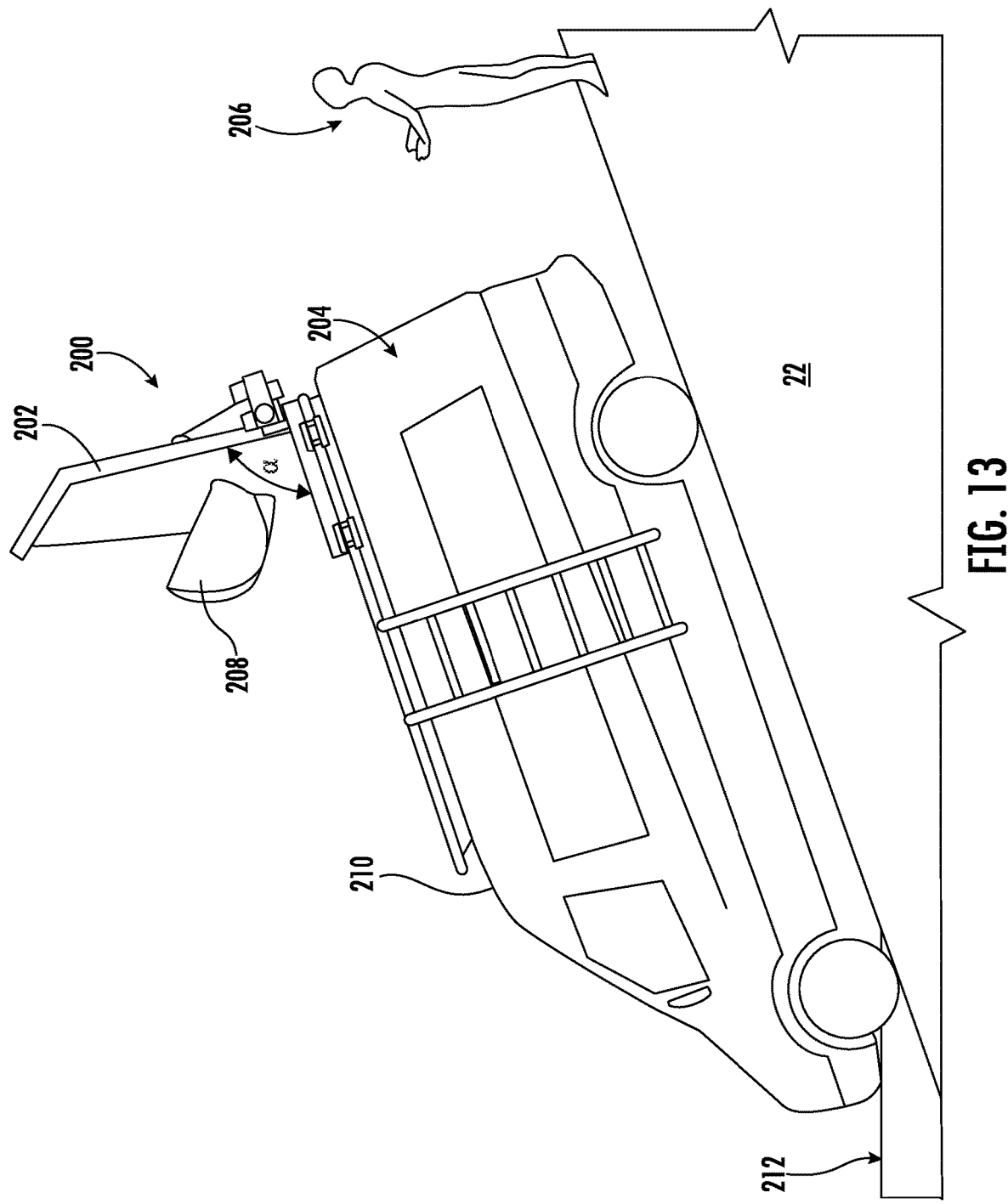
Figure 14:
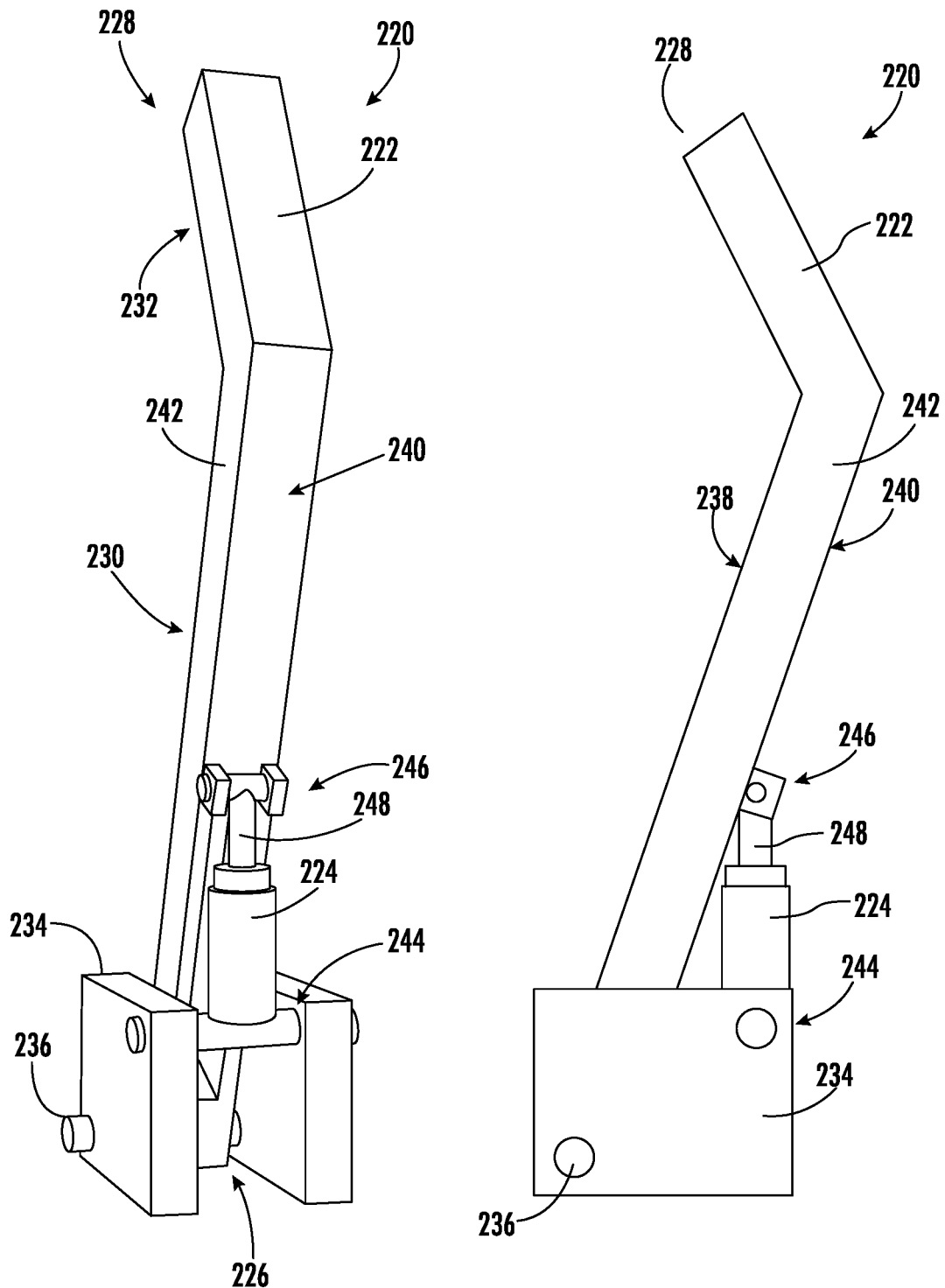
Figure 15:
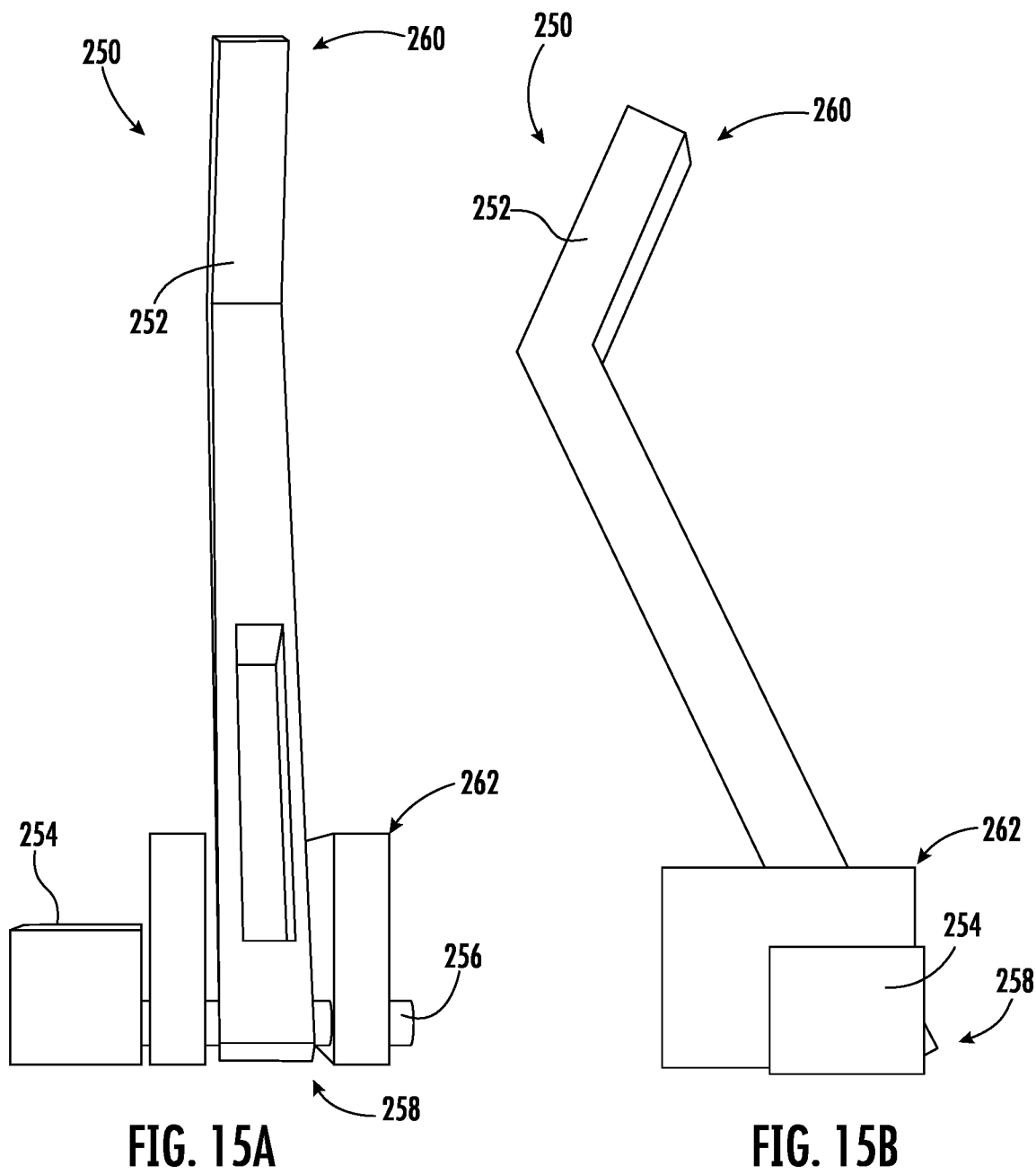
Figure 16:
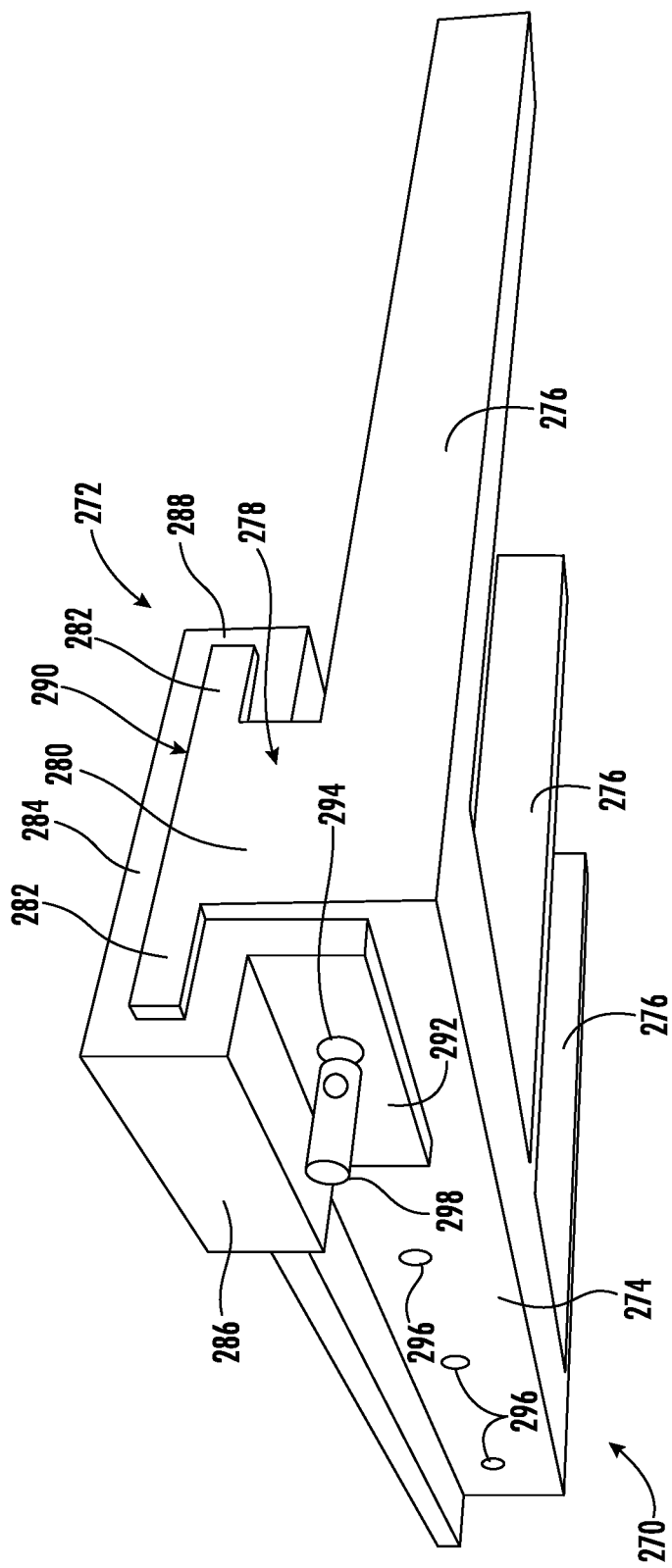
Figure 17:
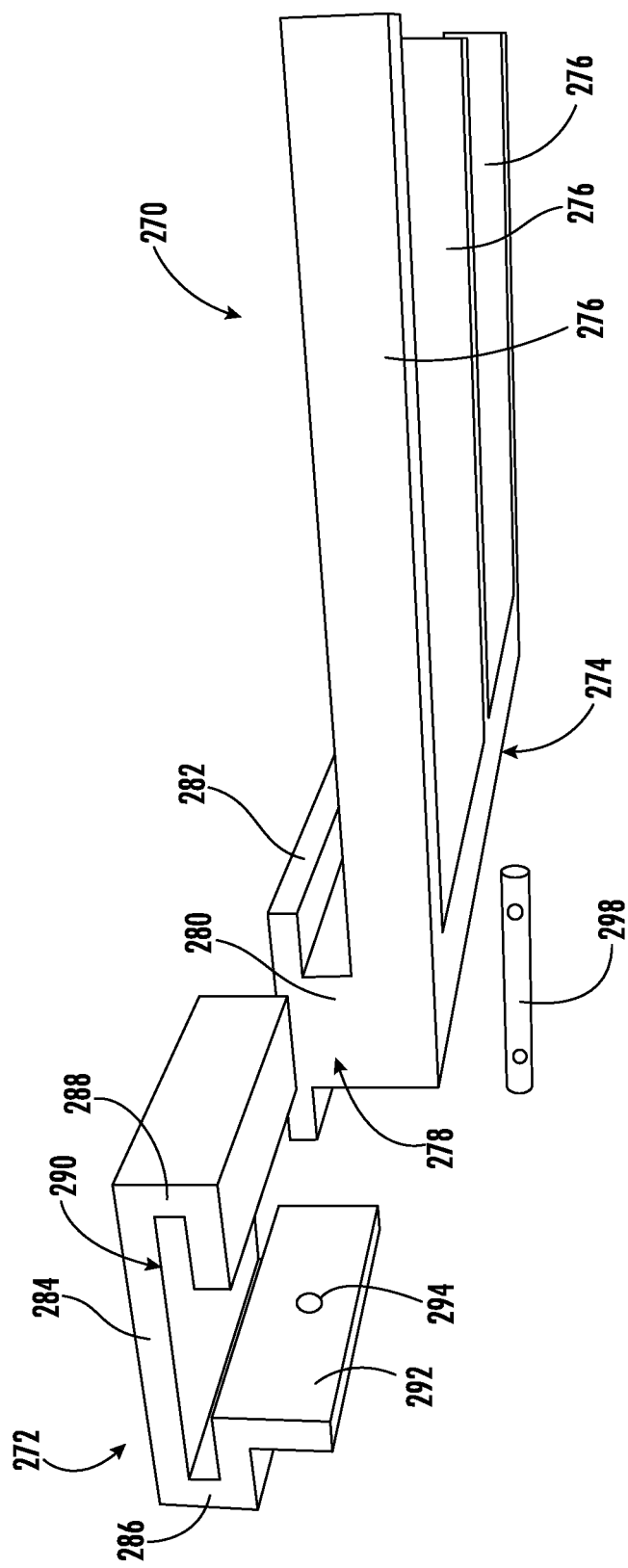
Figure 18A:
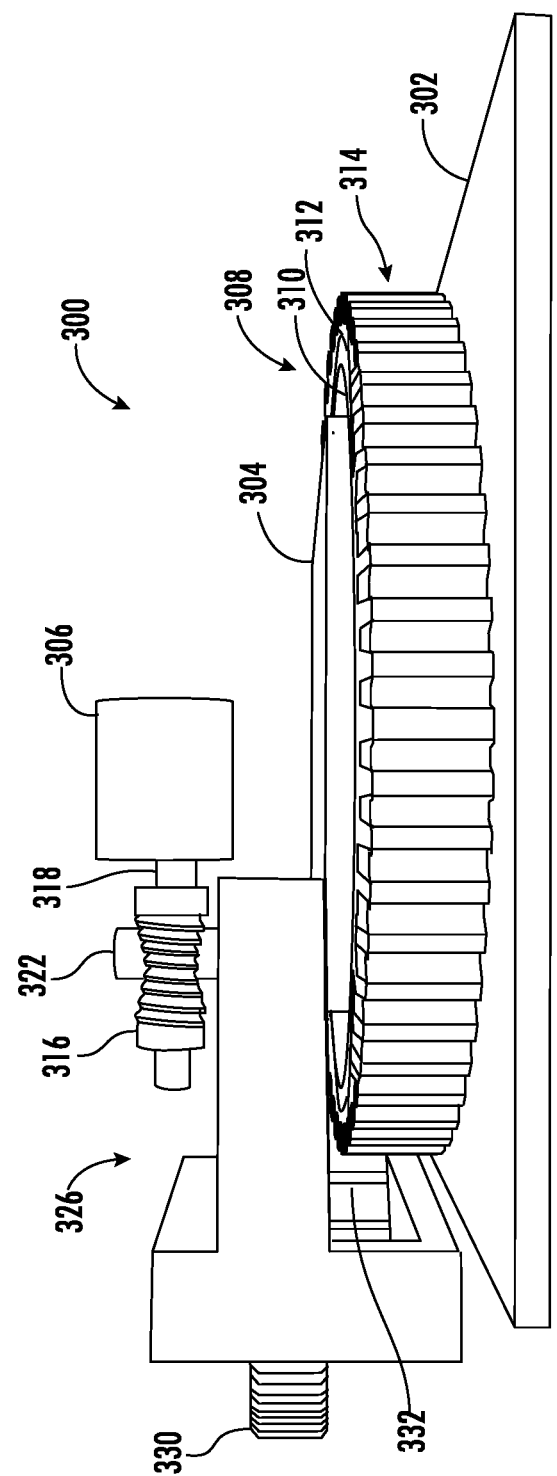
Figure 18B:
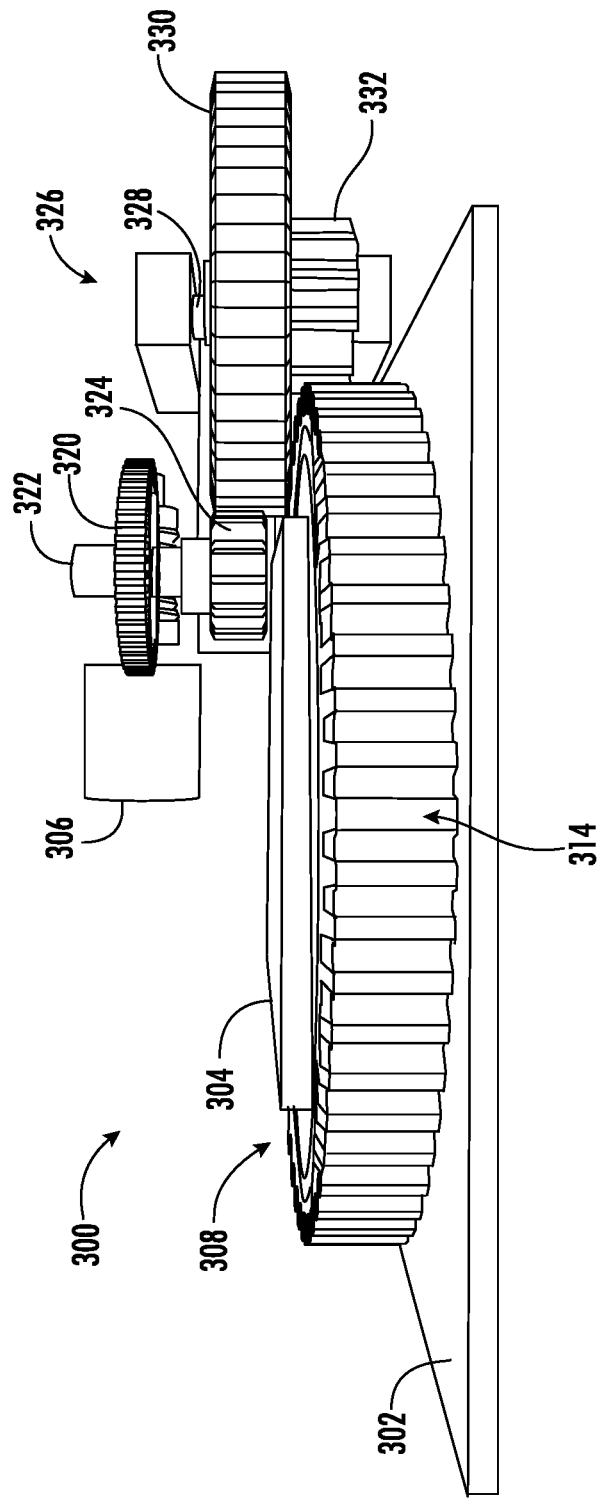
Figure 18C:
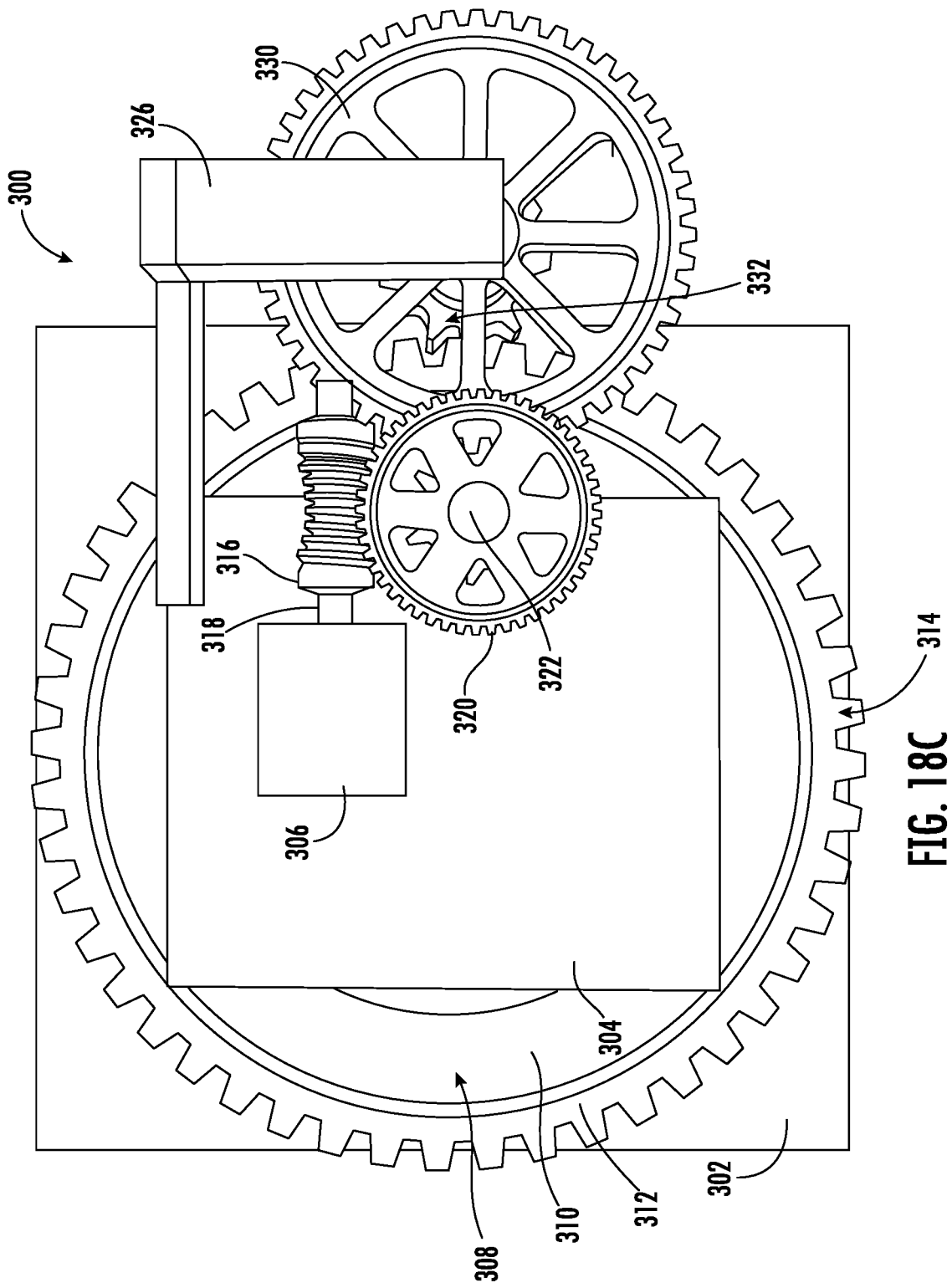
Figure 18D:
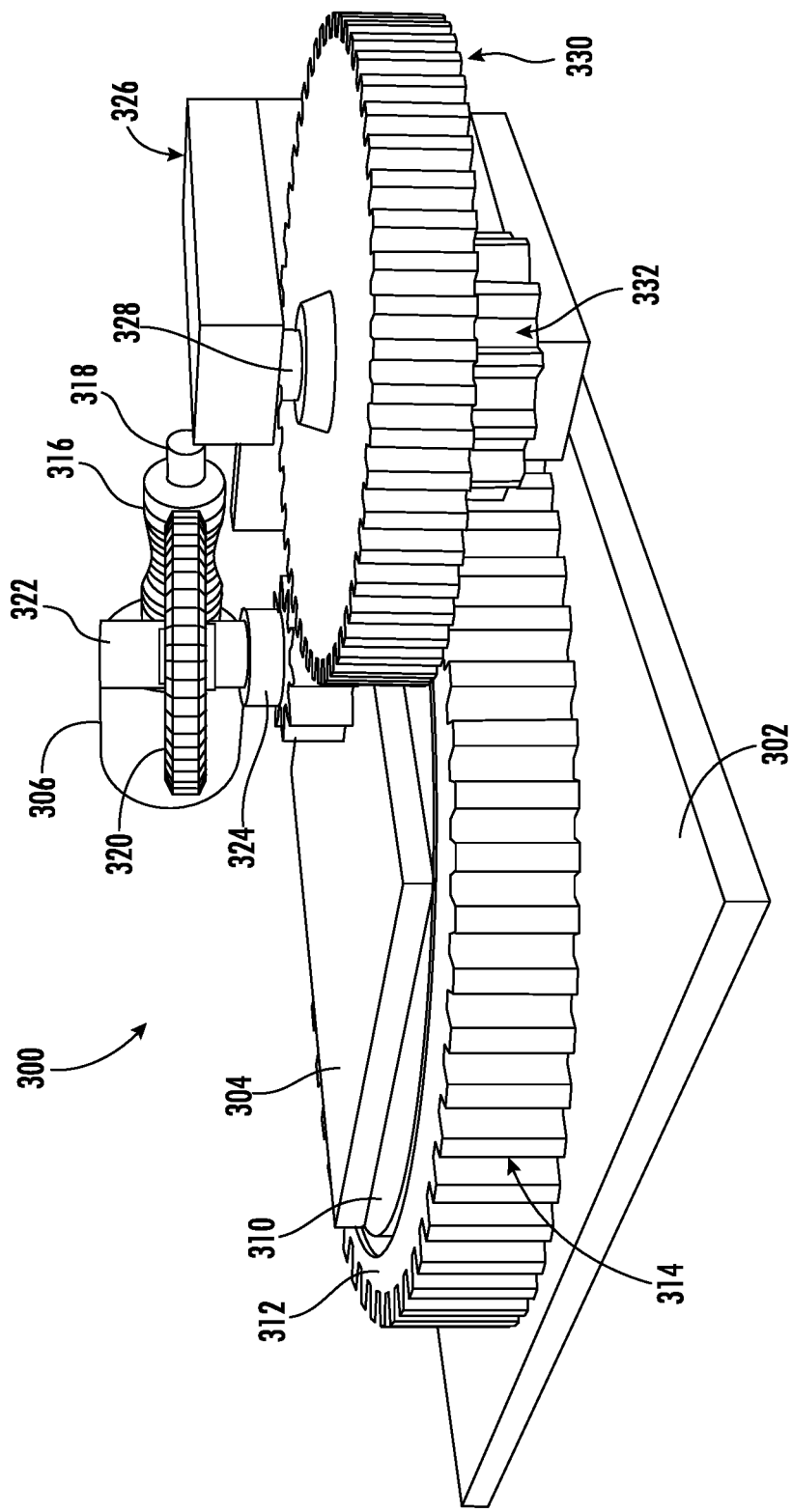
Figure 19:
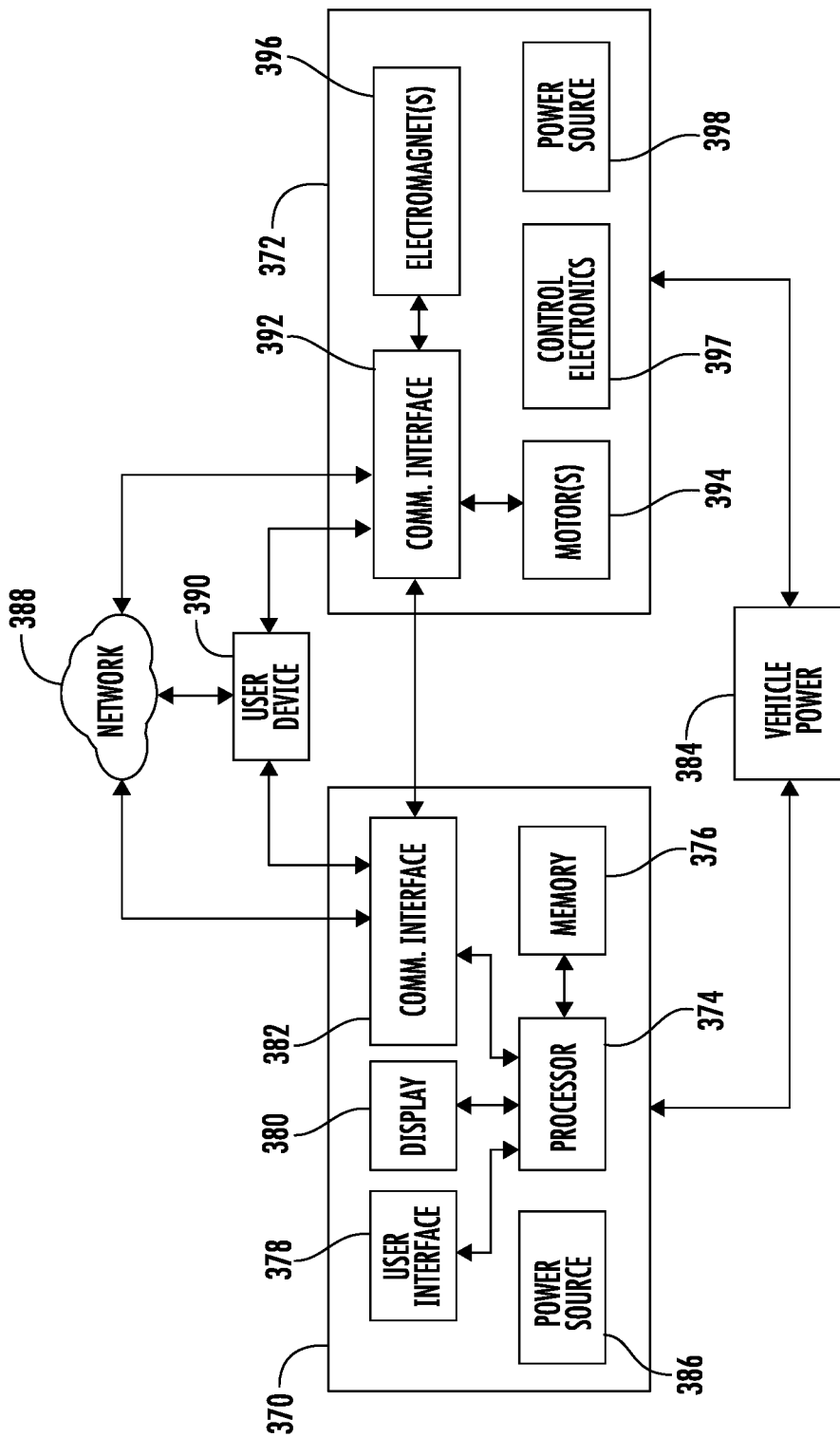
Figure 20:
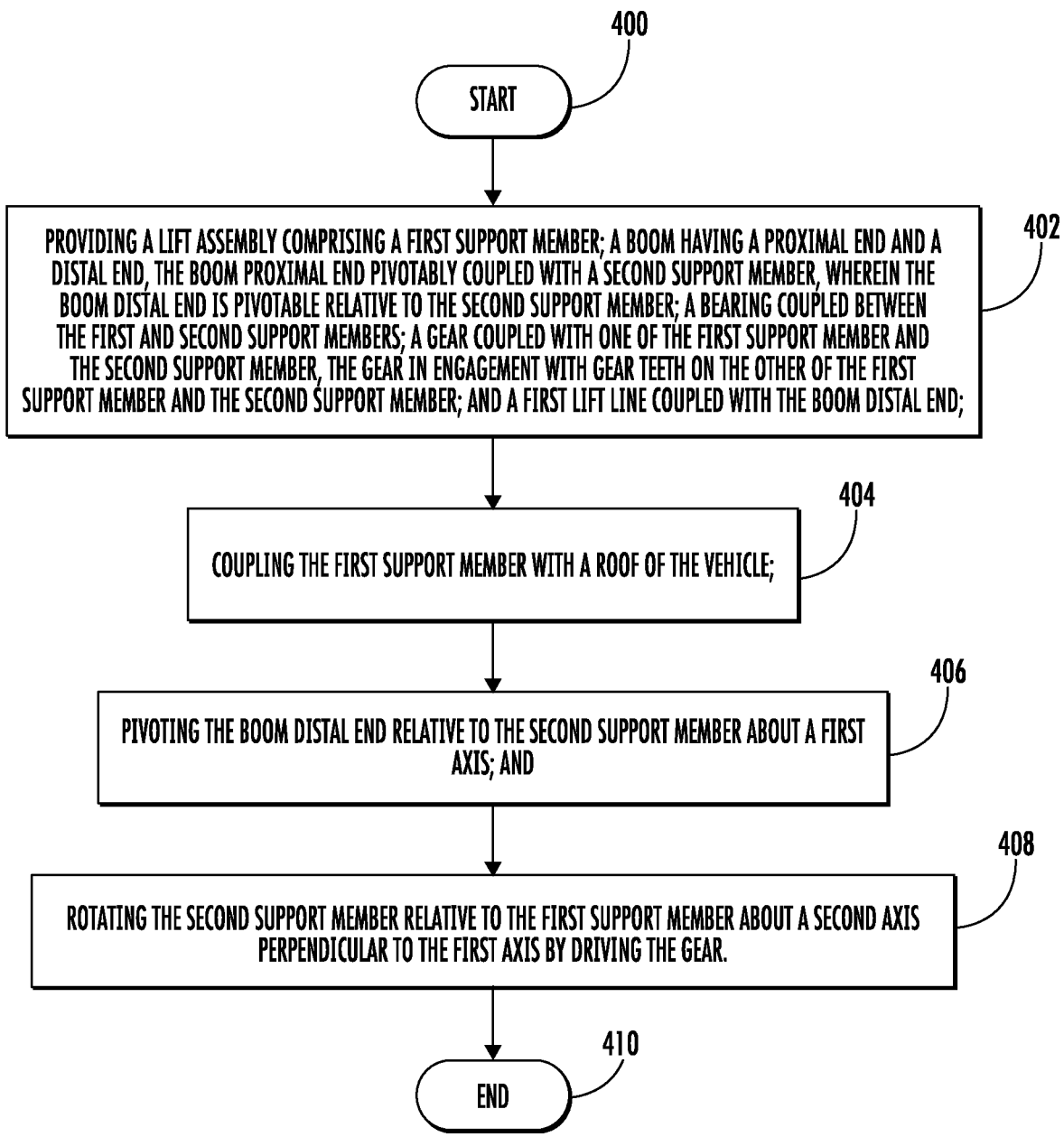
Figure 21:
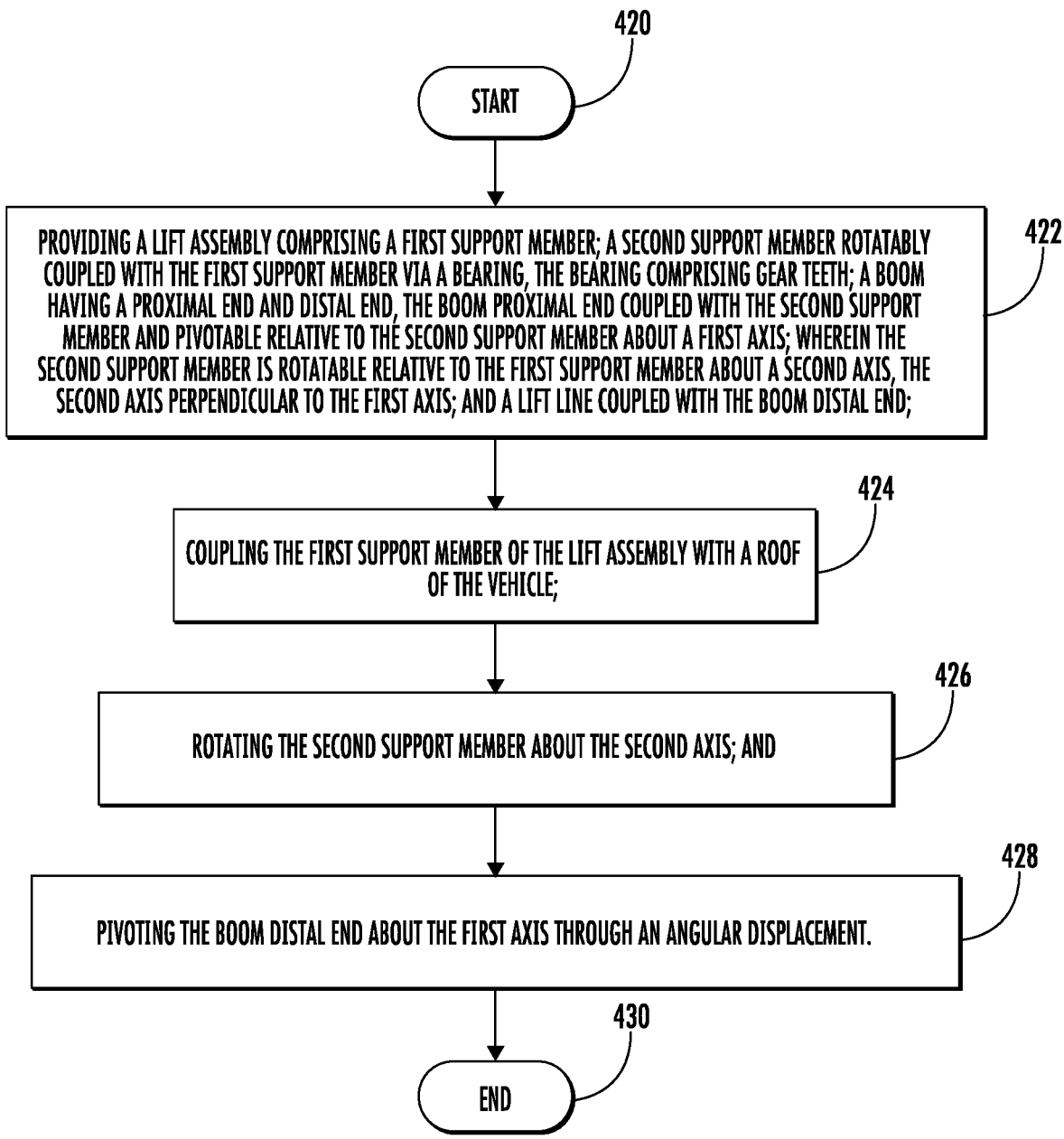
Figure 22:
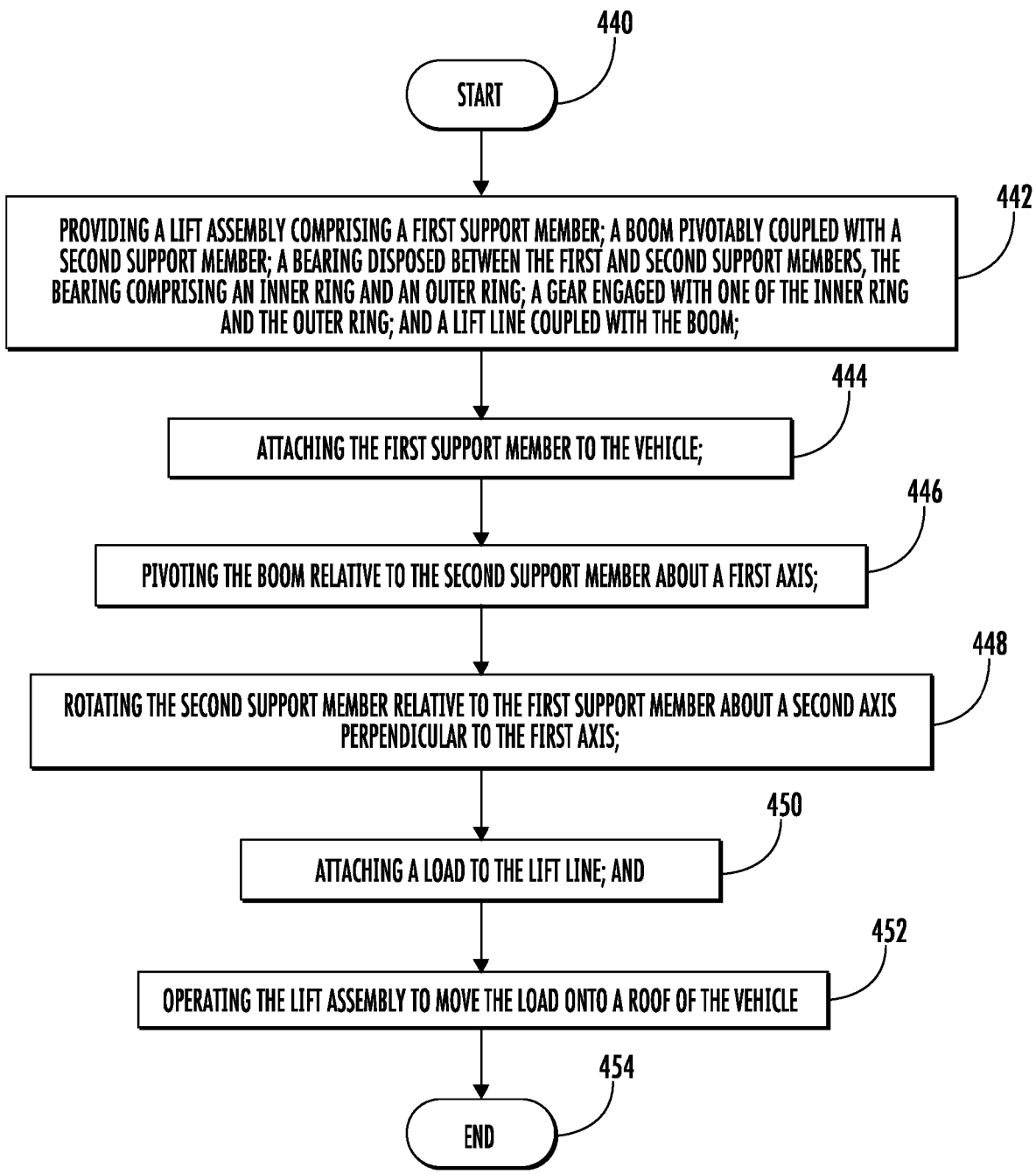

Having thus described some example embodiments in general terms, reference will now be made to the accompanying drawings, which are not necessarily drawn to scale, and wherein:

FIG. 1 is a perspective view of a lift assembly coupled with the roof of a vehicle and an object adjacent the vehicle on the ground to be lifted onto the roof of a vehicle in accordance with an embodiment of the present invention;

FIG. 2 is a perspective view of the lift assembly and vehicle of FIG. 1 wherein the lift assembly is being used to lift the object and wherein a boom of the lift assembly is in an outboard position;

FIG. 3 is a perspective view of the lift assembly and vehicle of FIG. 1 wherein the lift assembly is being used to lift the object and wherein a boom of the lift assembly is in an inboard position;

FIG. 4 is a detail perspective view of the lift assembly of FIGS. 1-3 wherein the boom is in a lowered position;

FIG. 5 is another detail perspective view of the lift assembly of FIGS. 1-3;

FIG. 6 is a detail perspective view of the first and second support members of the lift assembly of FIGS. 1-3 in accordance with an embodiment of the present invention;

FIG. 7 is a left side exploded view of the lift assembly of FIGS. 1-3;

FIG. 8 is a right side exploded view of the lift assembly of FIGS. 1-3;

FIG. 9 is a detail exploded view of the first and second support members and first and second winches of the lift assembly of FIGS. 1-3;

FIG. 10 is another detail exploded view showing the first and second support members and the bearing of the lift assembly of FIGS. 1-3;

FIG. 11 is yet another detail exploded view showing the bearing of the lift assembly of FIGS. 1-3;

FIG. 12 is a further detail exploded view showing the boom of the lift assembly of FIGS. 1-3;

FIG. 13 is a side view of a lift assembly in accordance with an embodiment of the invention coupled with a vehicle that is disposed on an inclined surface;

FIGS. 14A-14B are schematic rear perspective and side elevation views of a boom and actuator of a lift assembly in accordance with an embodiment of the present invention;

FIGS. 15A-15B are schematic front perspective and side elevation views of a boom and actuator of a lift assembly in accordance with an embodiment of the present invention;

FIG. 16 is a perspective view of a base and support member of a lift assembly in accordance with an embodiment of the present invention;

FIG. 17 is an exploded view of the base and support member of FIG. 16;

FIGS. 18A-18D are respective front, back, top plan, and perspective views of a gear arrangement of a lift assembly in accordance with an embodiment of the present invention;

FIG. 19 is a block diagram of a control device in electronic communication with a lift assembly in accordance with an embodiment of the present invention;

FIG. 20 is a flow chart illustrating operations in a method of operating a lift assembly in accordance with an embodiment of the present invention;

FIG. 21 is a flow chart illustrating operations in a method of operating a lift assembly in accordance with another embodiment of the present invention; and FIG. 22 is a flow chart illustrating operations in a method of operating a lift assembly in accordance with another embodiment of the present invention.

Repeat use of reference characters in the present specification and drawings is intended to represent same or analogous features or elements of embodiments of the present invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Further, either of the terms "or" and "one of A and B," as used in this disclosure and the appended claims is intended to mean an inclusive "or" rather than an exclusive "or." That is, unless specified otherwise, or clear from the context, either of the phrases "X employs A or B" and "X employs one of A and B" is intended to mean any of the natural inclusive permutations. That is, either phrase is satisfied by any of the following instances: X employs A; X employs B; or X employs both A and B, regardless whether the phrases "at least one of A or B" or "at least one of A and B" are otherwise utilized in the specification or claims. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

As noted above, embodiments of the present invention comprise a lift assembly that may be coupled with a roof of a vehicle. Certain embodiments are described below in the context of a lift assembly that is attachable to a passenger van, but those of skill in the art will appreciate that the present invention is not so limited. For instance, as used herein, the term vehicle refers to any wheeled transport device, including, but not limited to, cars, vans, SUVs, and trucks. Likewise, in various embodiments, a lift assembly according to the present invention may be coupled with a roof rack of a vehicle (e.g., to side rails extending parallel with the vehicle's longitudinal axis and/or to transverse cross-members extending perpendicularly to the side rails), but this is not required in all embodiments. Indeed, in various embodiments the lift assembly may be coupled directly or indirectly with a vehicle's roof, and it also could be coupled with a truck's bed, for example.

Turning first to FIGS. 1-3, illustrated is a lift assembly 10 coupled with a roof 12 of a vehicle 14. A user 16 is shown operating a control device 18 to actuate the lift assembly 10 to lift an object 20, in this case a canoe, onto the roof 12 of vehicle 14, in this case an SUV. As will be discussed in more detail herein, lift assembly 10 may be operable electronically and/or automatically in some embodiments, and thus user 16 need not be able to reach lift assembly 10 or roof 12 to manually actuate the lift assembly 10 in such embodiments. Likewise, it is not required in various embodiments that user 16 have the physical strength to lift object 20 by herself in order to cause object 20 to be raised onto and lowered from roof 12 of vehicle 14. Additionally, even though vehicle 14 may be disposed on a non-level surface (e.g., boat ramp 22 in FIG. 13), as described herein, in various embodiments the lift assembly 10 is still operative to safely lift and lower object 20 and position it on roof 12 because a boom of the lift assembly 10 moves safely and predictably.

In general, and in this embodiment, lift assembly 10 comprises a base 24 coupled with a roof rack 26 of vehicle 14 and a boom 28 that is pivotable and rotatable with respect to base 24 and vehicle 10. A lift line 30 is coupled with the boom. In FIG. 1, boom 28 is in a lowered, or stored, position wherein its longitudinal axis may be substantially parallel with roof 12. As shown, in this embodiment, lift line 30 may be stowed by attaching a carabiner 32 disposed at the terminal end of lift line 30 to a ring 34 on vehicle 10. In FIG. 2, boom 28 has been pivoted to a raised, or operative, position and rotated to an outboard position. Lift line 30 has been lowered so that carabiner 32 is attached to object 20, and then lift line 30 has been raised to raise object 20 off of the ground. In FIG. 3, lift line 30 has been further raised and boom 28 has been pivoted upward to raise object 20 to a height above roof 12, and boom 28 further has been rotated to an inboard position. This allows object 20 to be centered on base 24 and/or roof rack 26 all without user 16 having to directly touch the load.

Additional detail regarding various embodiments of lift assembly 10 is provided with reference to FIGS. 4-12. Embodiments of the present invention contemplate that lift assembly 10 may be coupled with a vehicle's roof directly or indirectly (e.g., via a roof rack), and it is contemplated that such coupling may occur in any known manner. As noted, in the illustrated embodiment lift assembly 10 is coupled with vehicle 14 (and more specifically, a roof rack 26 thereof) via a base 24. In various embodiments where base 24 is provided, a roof rack 26 need not also be provided, and base 24 can instead be coupled directly to roof 12. In other embodiments, base 24 is not required, and lift assembly 10 can be coupled to a roof rack 26 or directly to roof 12. Where provided, however, base 24 can help stabilize lift assembly 10 during operation and allow heavier objects to be lifted. As described in more detail below, boom 28 may be pivoted automatically relative to base 24.

Base 24 may have various configurations depending on the vehicle at issue and the intended use of lift assembly 10. In some embodiments, base 24 may be built into roof 12 and/or roof rack 26. As best seen in FIGS. 5 and 7-9, in one embodiment, base 24 comprises at least one first rail 36 and at least one second rail 38. In this embodiment, two first rails 36 are provided and three second rails 38 are provided. First rails 36 each define a first longitudinal axis 40, and second rails 38 each define a second longitudinal axis 42 (FIG. 8). First longitudinal axis 40 is perpendicular to longitudinal axis 42 in this embodiment. One of the longitudinal axes 40, 42 may be parallel to the long axis of vehicle 14 and the other of the longitudinal axes 40, 42 may be transverse to the long axis of vehicle 14.

First and second rails 36, 38 may have any suitable length dimension in various embodiments. In the illustrated embodiment, second rails 38 have a length dimension selected to span the entire width of the roof 12 of vehicle 14. In embodiments where boom 28 is shorter than the width of vehicle 12, second rails 28 may have a length equal to that of boom 28. In embodiments where boom 28 is longer than the width of vehicle 12, then second rails may have a length approximately equal to that of the width of vehicle 12. In various embodiments, second rails 28 may be at least as long as first rails 36. Either or both of first and second rails 36, 38 may also act as elevated cross-bars on which object 20 may rest. In some embodiments, first and second rails 36, 38 may comprise an outer liner (e.g., of rubber, foam, or another protective material) to support and avoid damage to object 20. This configuration may be useful, for example, in certain embodiments where vehicle 12 is large (such as a recreational vehicle) and has an AC unit 43 on the back that could otherwise limit the length of a load absent rails 36, 38, which instead allow the load to sit above the AC unit 43.

As shown, first and second rails 36, 38 may be coupled together via various fittings. The number and specific fittings used and the number of first and second rails 36, 38 used may vary depending on the type of vehicle and/or vehicle roof rack to which base 24 is to be attached. In this case, base 24 comprises a cross fitting 44, two tee fittings 46, and three coupling fittings 48. Each of these fittings 44, 46, and 48 defines one or more openings sized to receive an end of rails 36, 42. Although rails 36, 42 and the corresponding openings defined in fittings 44, 46, and 48 are shown as generally square in cross-section, it will be appreciated that these components may have any suitable cross-section. Also, rails 36 and 42 need not be the same size, length, or define the same cross-sectional dimensions in various embodiments. In various embodiments, rails 36 and 42 and fittings 44, 46, and 48 may be formed from a suitable high-strength material, such as metal.

As shown, each first rail 36 is coupled between one of the laterally opposed openings defined in cross fitting 44 and an opening defined in tee fittings 46. One second rail 38 is coupled between an orthogonal opening defined in cross-fitting 44 and an opening defined in a coupling fitting 48, and two other second rails 38 are coupled between orthogonal openings defined in the aforementioned tee fittings 46 and respective openings defined in coupling fittings 48. Each rail 36, 38 may be releasably connected with a fitting 44, 46, 48 via suitable fasteners 50 (FIGS. 7-8).

As will be appreciated, in this embodiment, base 24 is modular and can be assembled and re-assembled in various configurations. For instance, cross-fitting 44, to which boom 28 is coupled as described in more detail below, can be moved to various positions on a vehicle roof 12. Alternatively or in addition, multiple cross-fittings 44 could be provided, and boom 28 and the components of lift assembly 10 that operate boom 28 can be removed from and attached to each cross-fitting 44, as needed or desired.

In some embodiments, base 24 may have at least three widely-spaced points of contact with roof 12 and/or roof rack 26. In the illustrated embodiment, a plurality of brackets 52 are provided so that each fitting 44, 46, 48 can be releasably connected with roof rack 26. Although brackets 52 may take any suitable form in various embodiments (e.g., to accommodate different styles of roof racks), in this embodiment brackets 52 are "C" shaped, defining an internal opening sized to receive an upright portion of roof rack 26. Brackets 52 also each define a plurality of apertures sized to receive suitable fasteners 54, which may be received in corresponding apertures defined in each fitting 44, 46, 48. Thereby, each fitting 44, 46, and 48 may be seated on a portion of roof rack 26 above the upright portions about which each bracket 52 is received, and fasteners 54 may be used to connect fittings 44, 46, and 48 with each bracket 52 about a portion of roof rack 26. In other words, fittings 44, 46, and 48 may be clamped to roof rack 26 in this embodiment. Of course, other methods of attachment are contemplated in other embodiments. Examples include, but are not limited to, the adjustable couplings discussed in commonly-owned U.S. Pat. No. 11,130,435, entitled "Vehicle-Mounted Hoist Systems and Methods," issued Sep. 28, 2021, the entire disclosure of which is incorporated herein by reference for all purposes.

Next, lift apparatus 10 may comprise a first support member 60 and a second support member 62. As described in more detail herein, first support member 60 may be coupled with base 24 (if provided), and second support member 62 may be coupled with first support member 60. Additionally, boom 28 comprises a proximal end 64 and a distal end 66. Boom 28 proximal end 64 may be coupled with second support member 62 and pivotable with respect thereto about a first axis 68 (FIG. 9). Second support member 62 may be rotatable with respect to first support member 60 about a second axis 70 (FIG. 9), which may be perpendicular to first axis 68. First and second support members 60, 62 may be formed form a suitable metal material in various embodiments.

More particularly, in the illustrated embodiment, first support member 60 comprises a generally planar platform 72 that is integral with cross fitting 44. In embodiments where base 24 is not provided, an analogous first support member may be coupled directly or indirectly with vehicle roof 12 and/or roof rack 26. Also, in various embodiments, platform 72 could be removably coupled with fitting 44 or any other fitting. Second support member 62 may also comprise a generally planar platform 74. Here, platform 72 is generally square in shape and platform 74 is generally circular in shape, but that is not required and any suitable shape may be used.

As noted above, second support member 62 may be rotatable with respect to first support member 60. In general, in various embodiments, a gear is coupled with one of the first support member 60 and the second support member 62, and the gear is in engagement with gear teeth on the other of the first support member 60 and the second support member 62. In some embodiments, first and second support members 60, 62 may be coupled together via a gear arrangement. Also, in various embodiments, second support member 62 may be coupled with first support member 60 via a bearing, and the bearing may comprise gear teeth. Further, in various embodiments, a bearing comprising an inner ring and an outer ring is disposed between first support member 60 and second support member 62, and a gear is engaged with one of the inner ring and the outer ring. Second support member 62 need not be disposed above first support member 60 and/or above a bearing and/or gear in all embodiments. Rather, in some embodiments, second support member 62 could comprise a tube that rotates around first support member 60.

With reference in particular to FIGS. 9-11, in the illustrated embodiment, lift assembly 10 comprises a bearing 76 comprising an inner ring 78 and an outer ring 80. Rolling elements of bearing 76, such as balls or rollers, are not shown. Axis 70 may be centered with respect to inner ring 78 and outer ring 80. Inner ring 78 is coupled with second support member 62 in this embodiment, though in other embodiments inner ring 78 may be coupled with first support member 60. For example, platform 74 defines a plurality of apertures 82, and inner ring 78 defines a plurality of corresponding apertures 84. When apertures 82, 84 are in alignment, fasteners 86 may pass through apertures 82, 84 to secure the parts together. Outer ring 80 is coupled with first support member 60 in this embodiment, but in other embodiments outer ring 80 may be coupled with second support member 62. For instance, platform 72 defines a plurality of apertures 88, and outer ring 80 defines a plurality of corresponding apertures 90. When apertures 88, 90 are in alignment, fasteners 92 may likewise pass through apertures 88, 90 to secure these parts together. In some embodiments, the locations of apertures 88, 90 are selected such that not all points of attachment of the outer ring 80 are on the same half of outer ring 80. In one embodiment, bearing 76 may be or comprise a slewing bearing. As a result, second support member 62 is rotatable on inner ring 78 relative to outer ring 80 and first support member 60.

Also in this embodiment, outer ring 80 comprises gear teeth 94 disposed on a peripheral surface thereof. Of course, in other embodiments, and where provided, gear teeth 94 may be disposed on inner ring 78. Here, gear teeth 94 are in engagement with the teeth of a pinion gear 96 that is coupled with second support member 62. In particular, second support member may support a motor 98 (e.g., an electric DC motor) operative to drive a depending shaft 100, and pinion 96 is coupled for rotation with shaft 100, e.g., via a nut 101 threaded on shaft 100. In some embodiments, pinion 96 may have a smaller diameter than outer ring 80.

In various embodiments, other types of gears and/or gear arrangements beyond pinion 96 may be used to drive either of the rings of bearing 76. For instance, pinion 96 could instead be a worm gear driven by a motor in some embodiments. Also, in various embodiments, motor 98 and pinion 96 (or another type of gear) need not be disposed on second support member 62. These components could be disposed on first support member 60 or another support member, for example. Likewise, gear teeth 94 need not be coupled with outer ring 80 in all embodiments and could instead be coupled with inner ring 78 or another structure that is coupled with second support member 62.

Motor 98 may comprise or be coupled with a gear train 102 comprising, e.g., a worm gear (see FIGS. 18-19) and/or one or more other gears. Motor 98 may be supported on second support member 62 in any suitable manner, but as shown, for example, motor 98 may be coupled with an annular projection 104 extending from platform 74. In this embodiment, projection 104 defines a central aperture 106 through which shaft 100 extends and a plurality of apertures 108 sized to receive posts 110 that depend from gear train 102. Nuts 111 may be threadably received on posts 110 to secure gear train 102 (and motor 98) to projection 104. Of course, actuators other than a motor are contemplated in other embodiments and include, but are not limited to, pneumatic actuators.

In various embodiments, use of a slewing bearing or similar can offer higher torque and resulting control over a load lifted by lift assembly 10 when the load is swung inboard or outboard. This may be especially important if the vehicle 14 to which lift assembly 10 is attached is on uneven terrain, the load is heavy, and/or the boom is at an angle that generates a large moment. Further, because it may have a large circumference, a slewing bearing or similar may provide a wider base with a resulting greater surface area between the first and second support members 60, 62. This greater surface area may enhance the stability and safety of the connection between first and second support members 60, 62 in some embodiments. Also, in various embodiments, a slewing bearing or similar preferably is disposed (when viewed from above) within a rectangle define by the tires of the vehicle to which it is coupled. This may make it less likely that the vehicle will tip over in the event a user attempts to lift a very heavy object.

Although not shown, power may be supplied to motor 98 via a cable that extends to vehicle 14's electrical system (e.g., to a cigarette lighter or other outlet) or to an external power source, such as a generator or battery. The wires may be connected directly to motor 98 or to one or several electrical brush-rings coupled with first support member 60. Some embodiments may include a power relay box that is disposed in-line between the power source and motor 98 (and other motors, where provided). The power relay may be operative to ensure only one motor is active at a time, to help prevent overloading of the vehicle's electrical system or causing accidents as a result of user error. The power relay may also contain receivers for wireless transmitters associated with a control box, as discussed elsewhere herein. The control box may control which motor(s) receive current from the power source, as is well understood.

Thus, in various embodiments, pinion gear 96 coupled with support member 62 may be manually or automatically actuated to cause movement of the inner ring 78 relative to outer ring 80, and thereby to pivot the components of lift assembly 10 that are coupled with second support member 62 about axis 70. Thereby, boom 28 may be moved from an inboard position to an outboard position, and vice versa. In various embodiments, and depending on the manner in which power is supplied to motor 98 and the type of motor 98 used, the angular displacement about axis 70 may be between about 0 degrees and 360 degrees. Where motor 98 is battery powered or where brush rings are used, there is not a need to be concerned about electrical wires becoming wrapped about lift assembly 10, and thus the angular rotation may be greater than 360 degrees in either direction.

Referring now also to FIGS. 6 and 12, as noted above, in this embodiment, boom 28 is pivotably coupled with second support member 62 so that it pivots about axis 68. In this regard, and for example, second support member 62 comprises two posts 112 (e.g., metal angles) projecting vertically upward from platform 74. Laterally opposed apertures 114 are defined in respective posts 112 and are in alignment with axis 68. Proximal end 64 of boom 28 comprises corresponding apertures 116, and a pin 118 passes through apertures 114, 116 to secure boom 28 for rotation about pin 118 and axis 68. In some embodiments, a pulley 120 also is provided on pin 118.

In some, but not all, embodiments, boom 28 may be pivoted via a winch 122 that is coupled with second support member 62. For example, winch 122 comprises a motor 124 operative to rotate a shaft 126 about which a lift line 128 is wound. A terminal end 130 of lift line 128 may be coupled with boom 28, e.g., at an eye 132. Actuation of motor 124 causes shaft 126 to rotate, winding or unwinding lift line 128, depending on the direction of rotation. In so doing, boom 28 is lifted or lowered. Winch 122 may be coupled with second support member 62 in a variety of ways. Here, second support member 62 comprises two additional posts 129 (e.g., metal angles) projecting vertically upward from platform 74. Posts 129 support a platform 131, to which winch 122 is coupled via suitable fasteners that are received in apertures 133 defined in a bottom surface of winch 122 and corresponding apertures defined in platform 131.

Boom 28 may have a variety of configurations in various embodiments. For example, boom 28 may comprise a single piece (e.g., a rectangular hollow tube) or multiple pieces (two or more rectangular hollow tubes, which may extend parallel to one another or converge at a point). The piece(s) of boom 28 may also be straight in some embodiments or have one or more bends therein. As shown, in one embodiment, boom 28 comprises two lengths of rectangular hollow tubing 134 that extend parallel with one another. Also, tubing lengths 134 each include an angled or bent portion 135 generally located proximate the distal end 66 of boom 28. In various embodiments, boom 28 may have a telescoping component.

In use, boom 28 may be pivoted from the stored, or lowered, position shown in FIGS. 1 and 4 to an operative, or raised position shown, for example, in FIGS. 2-3. The angular displacement of boom 28 (e.g., the angle between the plane in which the bearing 76 lies or, alternatively, the plane in which platform 74 lies and the boom 28) may be about 90 degrees in some embodiments. In other embodiments discussed in more detail below, the angular displacement of boom 28 may exceed 90 degrees. In certain embodiments, the angular displacement of boom 28 may be about 110 degrees. In some embodiments, a stop bar 136 may extend between posts 112 to limit angular displacement beyond a predetermined amount, but this is not required in all embodiments. Additionally, in various embodiments, angular displacement of the boom below the plane of the bearing 76 and/or platform 74 will not be possible.

Additionally, in various embodiments, the angular position of boom 28 may be adjusted while under load, which may be desirable in situations in which a bulky object 20 is being lifted. For example, a user 16 may prefer to have boom 28 at about 20 degrees (e.g., relatively horizontal) when lifting object 20 from the ground to a level just above the roof 12 of vehicle 14, such that there is adequate clearance of object 20 to prevent damage to object 20 or to vehicle 14. Once the load is above the level of vehicle 14, user 16 may prefer to pivot boom 28 to a higher angular position such that object 20 may be maneuvered along the transverse axis of roof rack 26 and may be centered or placed closer to an edge thereof. Thus, embodiments of the present invention provide greater freedom of movement and positioning of an object 20 on a vehicle 14 roof 12.

As noted above, lift assembly 10 comprises a lift line 30. Lift line 30 holds a load or object 20 during operation of lift assembly 10. Lift line 30 also may serve as a redundant safety mechanism in some embodiments. Lift line 30 may be formed of any suitable material familiar to those of skill in the art for lifting and lowering various heavy objects, including metal cables, chains, or high-tensile strength rope, among others. As those of skill in the art will appreciate, the characteristics of lift line 30 may vary, as needed or desired, depending on the intended use of lift assembly 10. As described above, when boom 28 is in the folded, or stowed, position shown in FIGS. 1 and 4, an attachment mechanism such as a carabiner, clip, or the like may be secured to a ring 34 on vehicle 14. As will be appreciated, this may help secure boom 28 during movement of vehicle 14 and ensure that the boom 28 does not move in either the horizontal or vertical directions when vehicle 14 is moving. In various embodiments, the attachment mechanism may comprise a carabiner, hook, magnetic attachment (permanent or electrical), clip, etc. The attachment mechanism may be secured or released manually or automatically (e.g., electric magnet). An external or native lock also may be used in various embodiments to prevent theft.

In the illustrated embodiment, for example, operation of lift line 30 is controlled by a second winch 138. As with winch 122, winch 138 comprises a motor 140 operative to rotate a shaft 142 about which lift line 30 is wound. Lift line 30 is coupled with distal end 66 of boom 28. In that regard, boom 28 may comprise one or more additional pulleys (e.g., pulleys 144, 146, and 148, as shown in FIGS. 4 and 12) that support movement of lift line 30. Actuation of motor 140 causes shaft 142 to rotate, winding or unwinding lift line 30, depending on the direction of rotation. In so doing, lift line 30 and any object 20 attached thereto is lifted or lowered. Winch 138 may be coupled with second support member 62 in a variety of ways. Here, winch 138 is coupled via suitable fasteners that are received in apertures 150 defined in a bottom surface of winch 138 and corresponding apertures 152 defined in platform 74 (FIGS. 10-11).

In various embodiments, the attachment mechanism may connect with an intermediate device that, in turn, holds object 20. For example, the intermediate device may be a net that is used to carry one or more irregularly shaped objects 20. The intermediate device also could be used to increase the contact points with object 20 to distribute the force or to ensure the load stays in a desired alignment. For example, the intermediate device could be a ring which, in turn, has multiple chains that all have a link connected to the ring. In that manner, a carabiner can provide four points of lift that can be connected to receiving points on object 20.

Although not shown in the figures, in various embodiments lift assembly 10 may also comprise one or more fairings to reduce drag and noise. Example fairings are disclosed in U.S. Pat. No. 11,130,435, entitled "Vehicle-Mounted Hoist Systems and Methods," issued Sep. 28, 2021, the entire disclosure of which is incorporated herein by reference for all purposes.

With reference now to FIG. 13, as noted above, in some embodiments a lift assembly 200 may comprise a boom 202 that is pivotable through an angular displacement greater than 90 degrees. This may be desirable, for example, where a vehicle 204 of a user 206 is disposed on an inclined surface 22, in that it may make it possible and/or easier to maneuver a load to or from the vehicle 204. For instance, inclined surface 22 may be a boat ramp, and the user 206 may be operating lift assembly 200 to lift an object 208 (e.g., a kayak) from a roof 210 of vehicle 204 and lower the object 208 onto the ramp so that it can be launched into a body of water 212. In the embodiment of FIG. 13, lift assembly 200 is analogous to lift assembly 10 discussed above in many respects, except that lift assembly 200 does not include any impediment, such as stop bar 136, to angular displacement beyond 90 degrees. In the figure, angle $\alpha$ is about 110 degrees.

Referring now also to FIGS. 14A-14B and 15A-15B, other embodiments are contemplated for actuating a boom of a lift assembly. In these embodiments, the boom also may be pivotable through an angular displacement exceeding 90 degrees. In embodiments that employ a winch and cable to pivot the boom about a horizontal axis, the load's center of gravity may always be at or anterior to the crane's pedestal. In contrast, embodiments having "positive control" (e.g., the ability to both push and pull) the boom may facilitate operation of the crane even where the vehicle is on a steep incline and the load's center of gravity is directly above the pedestal as the boom is rotated from inboard to outboard or vice versa.

First, in the embodiment of FIGS. 14A-14B, a lift assembly 220 comprises a boom 222 that is pivotable via a linear actuator 224. Linear actuator 224 may be any type of linear actuator known to those of skill in the art, including electric, hydraulic, and pneumatic linear actuators. Linear actuator 224 may be contracted and extended, as is well understood, to raise and lower boom 222. In this embodiment, boom 222 has a proximal end 226 and a distal end 228, and boom 222 may have a lower portion 230 that is disposed at an angle to an upper portion 232. Boom 222 is pivotably coupled with a bracket 234 via a pin 236 located at boom 222 distal end 228.

Boom 222 in this embodiment comprises a square piece of tubing having an anterior side 238 and an opposite posterior side 240 and two lateral sides 242. Although not shown in FIGS. 14A-14B, a lift line for lifting an object is coupled with boom distal end 228 such that the load, when lifted, is on the anterior side 238 of boom 222. Notably, in this embodiment, linear actuator 224 is disposed on the posterior side 240 of boom 222. In particular, linear actuator 224 has a proximal end 244 pivotably coupled with bracket 234 and a distal end 246 (e.g., at the end of a telescoping piston 248) pivotably coupled with the posterior side 240 of boom 222. As shown in FIG. 14B, when linear actuator is contracted, boom 222 may be disposed at an angular position relative to a horizontal plane on which bracket 234 resides that is greater than 90 degrees.

Next, in the embodiment of FIGS. 15A-15B, a lift assembly 250 comprises a boom 252 that is pivotable by operation of a motor 254 that drives a shaft 256. In particular, boom 252 comprises a proximal end 258 and a distal end 260. At boom 252 distal end 260, boom 252 is coupled with shaft 256 (e.g., via welding) such that rotation of shaft 256 causes rotation of boom 252. Shaft 252 extends through and is rotatable within apertures defined in a bracket 262. In various embodiments, motor 254 and bracket 262 could be coupled with second support member 62.

With reference now to FIGS. 16-17, in some embodiments, a first support member of a lift assembly may be slidably coupled with a vehicle's roof rack or a base such that the first support member and the other components of the lift assembly it supports can be slid along the roof rack or base as needed. The illustrated embodiment includes a base 270 and a first support member 272 slidably coupled therewith. The function of first support member 272 is analogous to the functions performed by first support member 60, described above, except as modified as described below. Base 270 preferably is analogous in some respects to base 24, described above, and thus base 270 may comprise a first rail 274 and one or more second rails 276. As shown, the longitudinal axes of second rails 276 may be perpendicular to the longitudinal axis of first rail 274. Here, second rails 276 are integrally formed with first rail 274, though that is not required in all embodiments. Base 270 may be coupled with a roof rack of a vehicle or to the vehicle directly, or in other embodiments a vehicle's roof rack may comprise base 270.

In this embodiment, first rail 274 comprises an upper portion 278 configured to allow sliding movement of first support member 272 therealong. Upper portion 278 comprises a web 280 from which two lateral flanges 282 extend. In cross section, upper portion 278 may resemble a "T" in some embodiments. In various embodiments, the upper portion 278 may be provided on any or all of first rail 274 and/or second rail(s) 276.

First support member 272 in this embodiment comprises a top plate 284, and an outer flange 286 and an inner flange 288 respectively depend from the peripheral edges of top plate 284 that are parallel with first rail 274. Outer flange 286 and inner flange 288 define shapes that generally correspond to the shape of upper portion 278. Accordingly, together top plate 284, outer flange 286, and inner flange 288 define an internal slot 290 that is sized to slidably receive upper portion 278 therein. In other words, in various embodiments, first support member 272 may wrap around or envelop at least a portion of first rail 274. As such, when the lift assembly of which first support member 272 is a part is used to lift a heavy load that may be far from its center of gravity, the first support member 272 will remain attached to first rail 274.

In the illustrated embodiment, first support member 272 directly engages the upper portion 278 of first rail 274. Grease or other lubricant may be provided in slot 290 to facilitate sliding engagement. In other embodiments, first support member 272 is in indirect engagement with the upper portion 278 of first rail 274, for instance via wheels, rollers, bearings, or the like. In various embodiments, first support member 272 maybe manually or automatically slid along first rail 274, both when the lift assembly is under load and when it is not.

Flange 286 in this embodiment has a depending portion 292 in which an aperture 294 is defined. Web 280 also defines a plurality of apertures 296 that correspond to positions at which first support member 272 may be secured to first rail 274 as it is slid therealong. A pin 298 that may comprise detents in some embodiments may be used to releasably secure first support member 272 to first rail 274 via aperture 294 and one of apertures 296.

It will be appreciated that, in various embodiments, upper portion 278 may have a different cross-sectional shape and may also comprise multiple parallel rails. In some embodiments, first support portion 272 could comprise a tube with a longitudinal slot defined therein, and the slot could be dimensioned to engage a rod or the like coupled with first rail 274. A wheel or the like could be disposed on the distal end of the rod to prevent the tube from separating from rail 274.

As noted above, in some embodiments a lift assembly may comprise a boom that is rotatable about a vertical axis (e.g., axis 70) by operation of a motor and one or more gears. In an embodiment described above, for example, a motor 98 is operative to drive a shaft 10 coupled with a pinion gear 96.

It was also noted that motor 98 may comprise or be coupled with a gear train 102 in that embodiment. In various other embodiments, one or more reduction gears may be provided between the motor and a pinion (or other gear) that is driven to cause rotation of the boom about the vertical axis. Reduction gears may amplify the motor's torque such that a smaller or lower-powered motor may be used and/or they may facilitate inboard/outboard rotation of a boom in an upwardly inclined direction when the vehicle is parked on a non-level surface.

In that regard, and while a variety of gear arrangements may be used in various embodiments, details regarding one example gear arrangement 300 for a lift assembly are provided with reference to FIGS. 18A-18D. In this embodiment, the gear arrangement 300 is coupled between a first support member 302 and a second support member 304. Support members 302 and 304 are analogous to support members 60 and 62, described above, and thus second support member 304 is rotatable relative to first support member 302, which is coupled with a base or vehicle roof or vehicle roof rack. A motor 306 also is coupled with second support member 304 similar to motor 98 described above, but this coupling is not shown in the figures.

First and second support members 302, 304 are coupled together via a bearing 308, which may be analogous to bearing 76 described above. Thus, bearing 308 comprises an inner ring 310 and an outer ring 312. Outer ring 312 is coupled with first support member 302, and inner ring 310 is coupled with second support member 304. By operating motor 306 to drive the gears in gear arrangement 300, a user can cause rotation of second support member 304 and inner ring 310 to rotate relative to first support member 302 and outer ring 312 about the axis of rotation of bearing 308.

In this embodiment, gear arrangement 300 comprises gear teeth 314 coupled with a peripheral surface of outer ring 312. Gear arrangement 300 also comprises a worm 316 coupled with a shaft 318 driven by motor 306. A wormwheel 320 is supported for rotation on a drive shaft 322. Also coupled with draft shaft 322 is a first reduction gear 324. A bracket 326 also is coupled with second support member 304 in this embodiment. Here, bracket 326 supports a vertically-extending shaft 328. A second reduction gear 330 is mounted for rotation about shaft 328 and is disposed vertically above a pinion gear 332, also mounted on and rotatable with respect to shaft 328. Second reduction gear 330 is coupled with (e.g., welded to) pinion gear 332. Pinion gear 332 is in engagement with the gear teeth 314 coupled with outer ring 312. As will be appreciated, bracket 326 is dimensioned such that it sits above and does not interfere with first support member 302 when second support member 304 is rotated.

In use, motor 306 turns shaft 318 either clockwise or counterclockwise based on the signal sent by a controller operated by a user. Rotation of shaft 318 rotates worm 316, which is engaged with and causes rotation of wormwheel 320 about the longitudinal axis of shaft 322. Rotation of wormwheel 320 and shaft 322 also causes rotation of first reduction gear 324. As first reduction gear 324 rotates, it causes rotation of second reduction gear 330 and pinion gear 332 about shaft 328. Rotation of pinion gear 332 causes rotation of second support member 304 and inner ring 310 relative to first support member 302 and outer ring 312.

In the event of a power failure or failure of motor 306, worm gear 316 may lock the position of bearing 308, so preventing undesired movement of the boom and other components of the lift assembly. In other words, and for example, the worm gear 316 may act as a brake. This safety feature may be desirable if the lift assembly is being used on an incline and the load was to swing suddenly in an unexpected direction due to the force of gravity. Other embodiments including a gear arrangement also may make use of a worm analogous to worm 316, but it will be appreciated that the worm need not be in the same configuration as that shown in FIGS. 18A-18D.

As noted above, in various embodiments it is contemplated that a user may control the operation of various movements and functions associated with a lift assembly. The user may do so using a control device, which may be a remote control, a standalone device that communicates with a user's device, or the user's device itself, among other things. Use of such a control device also may enable the lift assembly to be used by those with disabilities which may limit reach, strength, or coordination.

In this regard, FIG. 19 is a block diagram of a control device 370 in communication with a lift assembly 372 in accordance with an embodiment of the present invention. Lift assembly 372 may be analogous to lift assembly 10, described above, except as otherwise noted. Control device 370 and lift assembly 372 can include a number of different modules or components, each of which may comprise any device or means embodied in either hardware, software, or a combination of hardware and software, and which are configured to perform one or more corresponding functions. For example, control device 370 may include a processor 374 in electronic communication with a memory 376, a user interface 378, a display 380, and a communication interface 382. Further, control device 370 can be powered via vehicle power 384 in some embodiments, and in some embodiments it may also or alternatively include a power source 386.

Communication interface 382 may be configured to communicate with lift assembly 372 in any of a number of different manners as part of a lift assembly communication system, including, for example, via a network 388 and/or a user device 390. For instance, communications interface 382 can include any of a number of different communication backbones or frameworks, including, for example, Ethernet, the NMEA 2000 framework, GPS, cellular, WiFi, or other suitable networks. Communication between control device 370 and network 388, user device 390, and/or lift assembly 372 may be by any wired or wireless communication methods familiar to those of skill in the art. As noted above, in some embodiments, control device 370 may be the user's device, such as a mobile phone, laptop, or tablet computer, and in such an embodiment, user device 390 may not be provided.

Lift assembly 372 may include a communications interface 392 in electronic communication with one or more motor(s) 394 (e.g., analogous to motors 98, 124, and/or 140) and/or electromagnets 396. (As noted above, in certain embodiments, one or more motor(s) 394 may be replaced by a linear actuator.) In some embodiments, lift assembly 372 may also include control electronics 397 that are in electronic communication with communications interface 392. Likewise, lift assembly 372 can be powered via vehicle power 384 in some embodiments, and in some embodiments it may also or alternatively include a power source 398.

Processor 374 may be any means configured to execute various programmed operations or instructions stored in memory (e.g., memory 376), such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 374 as described herein. Although not required in all embodiments, where provided, control electronics 397 may be analogous to processor 374 in some embodiments, and it may comprise a processor and memory in some embodiments.

Display 380, e.g., a screen, may be configured to display images and may be configured to receive input from a user. Display 380 may be, for example, a conventional LCD, a touch screen display, or any other suitable display known in the art upon which images may be displayed. Thus, in some embodiments, display 380 may be configured to display user interface 378 thereon. In other embodiments, user interface 378 may include one or more buttons operative to receive user input by pressing or deflecting of the buttons.

The memory 376 may include one or more non-transitory storage or memory devices such as, for example, volatile and/or non-volatile memory that may be either fixed or removable. The memory 376 may be configured to store instructions, computer program code, and other data associated with the lift assembly in a non-transitory computer readable medium for use, such as by the processor for enabling the control device 370 to carry out various functions in accordance with example embodiments of the present invention. For example, the memory 376 could be configured to buffer input data for processing by the processor 374. Additionally or alternatively, the memory 376 could be configured to store instructions for execution by the processor 376.

Accordingly, in various embodiments, a user may use control device 370 (e.g., via display 380 and/or user interface 378) to provide instructions regarding the operation of lift assembly 372. Such instructions or functions may be conveyed to processor 374 and sent via communications interface 382, alone or in conjunction with network 388 and/or user device 390, to communications interface 392. Such instructions or functions may then be carried out by various components of lift assembly 372.

For example, the user interface 378 may present various optional commands for selection by a user. Such commands could include, but are not limited to, "move cable," "rotate boom," and "raise boom." The user interface 378 may further provide buttons for raising and lowering a wire, rotating the boom clockwise or counter-clockwise, and/or raising and lowering the boom. Additionally, in some embodiments, the user interface 378 may display a power status of the control device 370 and/or the lift assembly 372, and it may also provide an indication of whether one or more elements of lift assembly 372 (e.g., a support member) are level or not. Finally, in various embodiments, user interface 378 may display various warnings and informational messages to the user.

As discussed herein, various embodiments of the invention may enhance access to and use of lift assembly 10 by users with disabilities or with limited reach, strength, or coordination. For example, various movements of various components of lift assembly 10 described above may be powered via motors coupled with one or more gears or gear arrangements. Among other things, motors may be used to raise and lower lift lines 30 and 128 and a motor may be used to cause rotation of boom 28 between inboard and outboard positions relative to a vehicle. Also as described herein, operation of the one or more motors may be done via a remote control device, including, for instance, an app on a user's phone or mobile device, which the user may use without the need to physically access or operate the components of lift assembly 10. The remote control device may in some embodiments be powered by the vehicle's battery or could instead be powered by internal storage.

Embodiments of the present invention also provide methods for operating lift assemblies. Various examples of the methods performed in accordance with embodiments of the present invention will now be provided with reference to FIGS. 20-22. The operations illustrated in and described with respect to FIGS. 20-22 may, for example, be performed by, with the assistance of, and/or under the control of one or more of the processor 374, memory 376, communications interface 382, user interface 378, display 380, communications interface 392, motors 394, electromagnet(s) 396, control electronics 397, network 388, user device 390, and/or or another user device.

First, FIG. 20 is a flow chart according to example methods for operating a lift assembly in accordance with an embodiment of the present invention. At operation 400, the process starts. At operation 402, provided is a lift assembly comprising a first support member and a boom having a proximal end and a distal end. The boom proximal end is pivotably coupled with a second support member, and the boom distal end is pivotable relative to the second support member. The lift assembly also comprises a bearing coupled between the first and second support members and a gear coupled with one of the first support member and the second support member. The gear is in engagement with gear teeth on the other of the first support member and the second support member. Also, the lift assembly comprises a first lift line coupled with the boom distal end. At operation 404, the first support member is coupled with a roof of the vehicle. At operation 406, the boom distal end is pivoted relative to the second support member about a first axis. At operation 408, the second support member is rotated relative to the first support member about a second axis perpendicular to the first axis by driving the gear. At operation 410, the process ends.

Next, FIG. 21 is a flow chart according to example methods for operating a lift assembly in accordance with another embodiment of the present invention. At operation 420, the process starts. At operation 422, provided is a lift assembly comprising a first support member and a second support member rotatably coupled with the first support member via a bearing, the bearing comprising gear teeth. The lift assembly also comprises a boom having a proximal end and a distal end. The boom proximal end is coupled with the second support member and pivotable relative to the second support member about a first axis. The second support member is rotatable relative to the first support member about a second axis, the second axis perpendicular to the first axis. Additionally, the lift assembly comprises a lift line coupled with the boom distal end. At operation 424, the first support member of the lift assembly is coupled with a roof of the vehicle. Then, at operation 426, the second support member is rotated about the second axis. At operation 428, the boom distal end is pivoted about the first axis through an angular displacement. At operation 430, the process ends.

FIG. 22 is a flow chart according to example methods for operating a lift assembly in accordance with yet another embodiment of the present invention. At operation 440, the process starts. At operation 442, provided is a lift assembly comprising a first support member and a boom pivotably coupled with a second support member. The lift assembly also comprises a bearing disposed between the first and second support members. The bearing comprises an inner ring and an outer ring and a gear is engaged with one of the inner ring and the outer ring. A lift line is coupled with the boom. At operation 444, the first support member is attached to the vehicle. At operation 446, the boom is pivoted relative to the second support member about a first axis, and at operation 448, the second support member is rotated relative to the first support member about a second axis perpendicular to the first axis. At operation 450, a load is attached to the lift line. At operation 452, the lift assembly is operated to move the load onto a roof of the vehicle. Finally, at operation 454, the process ends.

Based on the foregoing, it will be appreciated that embodiments of the invention provide improved lift assemblies and systems and methods for operating a lifting assembly. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method of operating a lift assembly for a vehicle, the method comprising:
    providing a lift assembly comprising:
        a first support member;
        a boom having a proximal end and a distal end, the boom proximal end pivotably coupled with a second support member, wherein the boom distal end is pivotable relative to the second support member;
        a gear disposed between the first support member and the second support member; and
        a first lift line coupled with the boom distal end;
    coupling the first support member with a roof of the vehicle;
    pivoting the boom distal end relative to the second support member about a first axis; and
    rotating the second support member relative to the gear and to the first support member about a second axis perpendicular to the first axis.

2. The method of claim 1, wherein the coupling operation comprises coupling the first support member with a base.

3. The method of claim 2, wherein the base comprises a plurality of longitudinal rails.

4. The method of claim 2, wherein the coupling operation comprises attaching the base to the vehicle in at least three locations.

5. The method of claim 1, wherein the pivoting operation comprises operating a motor to drive a shaft coupled with the boom proximal end.

6. The method of claim 1, further comprising operating a first winch coupled with the second support member to raise the first lift line.

7. The method of claim 6, wherein the pivoting operation comprises operating a second winch, the second winch having a second lift line coupled with the boom.

8. The method of claim 1, wherein the rotating and pivoting operations are performed when the vehicle is disposed on a non-level surface.

9. A method of operating a lift assembly for a vehicle, the method comprising:
- providing a lift assembly comprising:
  - a first support member;
  - a second support member rotatably coupled with the first support member via a bearing, the bearing comprising gear teeth;
  - a boom having a proximal end and a distal end, the boom proximal end coupled with the second support member and pivotable relative to the second support member about a first axis;
  - wherein the second support member is rotatable relative to the first support member and to the gear teeth about a second axis, the second axis perpendicular to the first axis; and
  - a lift line coupled with the boom distal end;
- coupling the first support member of the lift assembly with a roof of the vehicle;
- rotating the second support member about the second axis; and
- pivoting the boom distal end about the first axis through an angular displacement.

10. The method of claim 9, wherein the angular displacement exceeds 90 degrees.

11. The method of claim 9, wherein the rotating operation comprises driving a worm gear.

12. The method of claim 11, wherein the worm gear is coupled with the second support member.

13. The method of claim 9, wherein the rotating operation comprises driving a pinion that is in engagement with the gear teeth.

14. The method of claim 9, wherein the rotating and pivoting operations are performed when the vehicle is disposed on a non-level surface.

15. A method of operating a lift assembly for a vehicle, the method comprising:
- providing a lift assembly comprising:
  - a first support member;
  - a boom pivotably coupled with a second support member;
  - a gear arrangement disposed between the first and second support members, the gear arrangement comprising at least one gear having plurality of gear teeth; and
  - a lift line coupled with the boom;
- attaching the first support member to the vehicle;
- pivoting the boom relative to the second support member about a first axis;
- rotating the second support member relative to the at least one gear and to the first support member about a second axis perpendicular to the first axis;
- attaching a load to the lift line; and
- operating the lift assembly to move the load onto a roof of the vehicle.

16. The method of claim 15, wherein the lift assembly further comprises a bearing disposed between the first and second support members, the bearing comprising an inner ring and an outer ring.

17. The method of claim 16, wherein the outer ring is coupled to the first support member.

18. The method of claim 15, wherein the lift assembly further comprises a base, the base comprising at least one rail, and wherein the first support member is coupled with the at least one rail.

19. The method of claim 18, further comprising sliding the first support member along the at least one rail.

20. The method of claim 18, wherein the base comprises a first rail having a first longitudinal axis and at least one second rail having a second longitudinal axis perpendicular to the first longitudinal axis.

* * * * *